Aug. 19, 1952          F. C. WILLIAMS                    2,607,913
                    RADIO NAVIGATION SYSTEM
Filed Aug. 6, 1947                              14 Sheets-Sheet 1

Inventor
F. C. Williams
By
Attorney

Inventor
FREDERIC C. WILLIAMS
By
Attorney

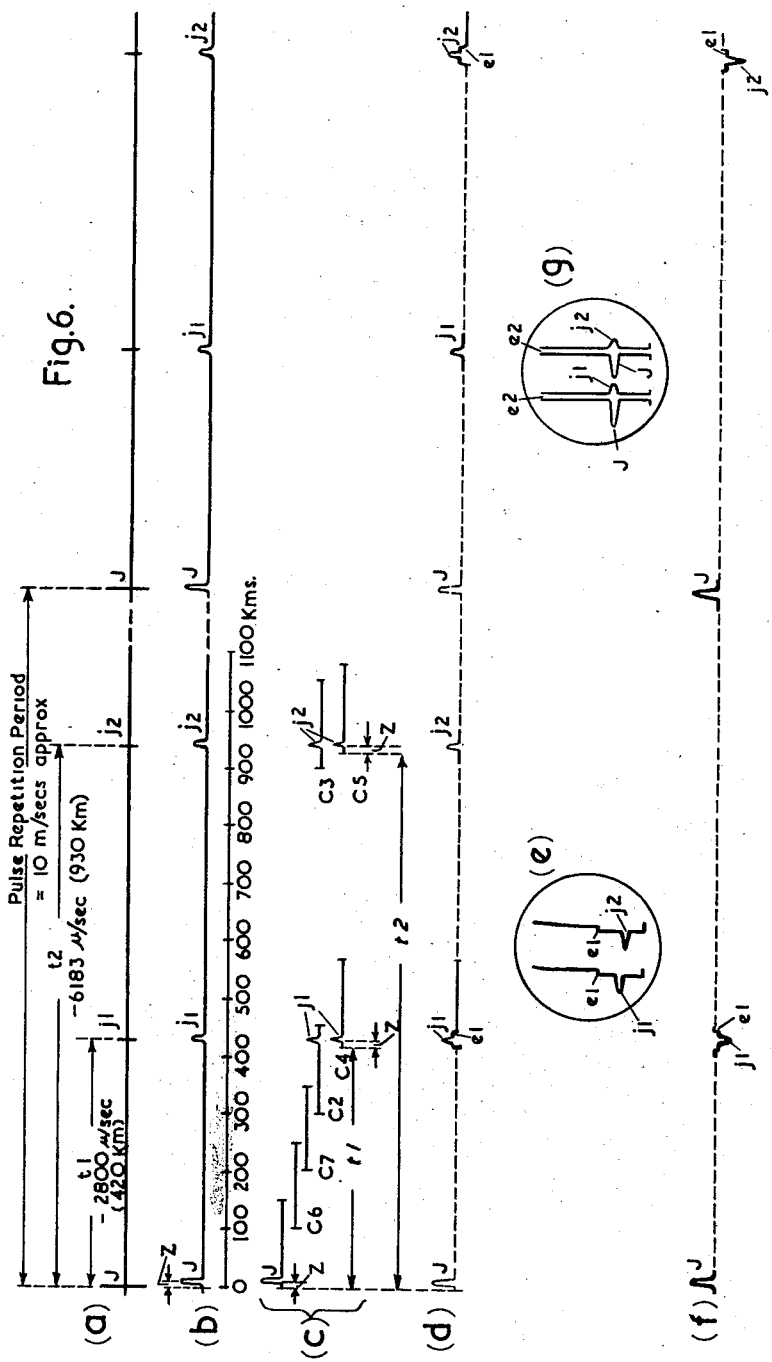

Aug. 19, 1952  F. C. WILLIAMS  2,607,913
RADIO NAVIGATION SYSTEM
Filed Aug. 6, 1947  14 Sheets-Sheet 8

Inventor
F. C. Williams
By Nelson Moore
Attorney

Patented Aug. 19, 1952

2,607,913

UNITED STATES PATENT OFFICE 2,607,913

RADIO NAVIGATION SYSTEM

Frederic Calland Williams, Timperley, England

Application August 6, 1947, Serial No. 766,650
In Great Britain September 15, 1943

Section 1, Public Law 690, August 8, 1946
Patent expires September 15, 1963

3 Claims. (Cl. 343—6)

This invention relates to radio signalling systems and more particularly to navigation systems employing radio signalling for enabling the navigator of a mobile craft such as an aircraft to determine the position of such craft relatively to known geographical positions. The systems according to the invention may be employed for general navigation purposes or for indicating to a navigator when the craft has reached a desired position or destination.

One object of the invention is to provide a navigation system which is independent of visibility conditions and is, therefore, effective at night or under other conditions of low visibility. Another object is to provide apparatus for use in such systems.

According to one feature of the invention a radio navigation system comprises at least two spaced transmitters located at known geographical positions and each arranged to radiate a characteristic signal-modulation in response to an interrogating signal-modulation radiated by a mobile craft which is equipped with means for providing simultaneously a visual indication of the time-interval between the radiation of an interrogating signal-modulation and the receipt of a response signal-modulation from one of the spaced transmitters and a visual indication of the time-interval between the radiation of an interrogating signal-modulation and the receipt of a response signal-modulation from another of said spaced transmitters.

According to another feature of the invention a radio navigation system comprises at least two spaced transmitters located at known geographical positions and each arranged to radiate a characteristic signal-modulation within a common frequency channel in response to an interrogating signal-modulation radiated by a mobile craft which is equipped with means for providing simultaneously a visual indication of the time-interval between the radiation of an interrogating signal-modulation and the receipt of a response signal-modulation from one of the spaced transmitters and a visual indication of the time-interval between the radiation of an interrogating signal-modulation and the receipt of a response signal-modulation from another of said spaced transmitters.

According to a further feature of the invention the said spaced transmitters are caused to radiate a response signal modulation only on receipt of a characteristic interrogation signal-modulation from the mobile craft.

The signal-modulations used for both interrogation and response are preferably of pulse form, each pulse signal-modulation consisting of one or more pulses of short time duration and being repeated periodically with zero or substantially zero value of carrier wave during the interval between each signal-modulation repetition.

The measurement, in the mobile craft, of the value of each of the time-intervals is preferably effected by cathode-ray tube means. Conveniently separate time base traces are used to display the response signal modulations from each of the spaced transmitters. Such separate time base traces are preferably provided upon a single cathode ray tube by deflecting the tube beam to form two traces alternately one after each interrogation signal modulation. In a preferred arrangement the measurement of the time interval between radiation of an interrogation signal modulation and the receipt of a response thereto is effected by the provision of a calibrated time delay device which retards the commencement of the time base trace for a known adjustable time interval following the radiation of the related interrogating signal modulation.

The delay imposed by such device is preferably controlled by means capable of selecting an adjustable number of whole cycles and a fraction of one cycle of a frequency-stable oscillation used as a time-reference medium. The selection of any desired fraction of one cycle of such reference oscillator is conveniently effected by the use of a phase-adjusting device in the form of a multi-section capacity goniometer whose individual sections are supplied with input waveforms suitably phase-displaced with respect to one another.

In order that the nature of the invention may be more readily understood certain forms of navigation systems embodying the invention and apparatus for use therewith will be described in greater detail by way of example with reference to the accompanying drawings in which:

Figure 6 is an explanatory diagram illustrating the manner of operation of the embodiment of Figure 5, Figures 7a, 7b, 7c comprise a series of waveform diagrams.

Figure 5:
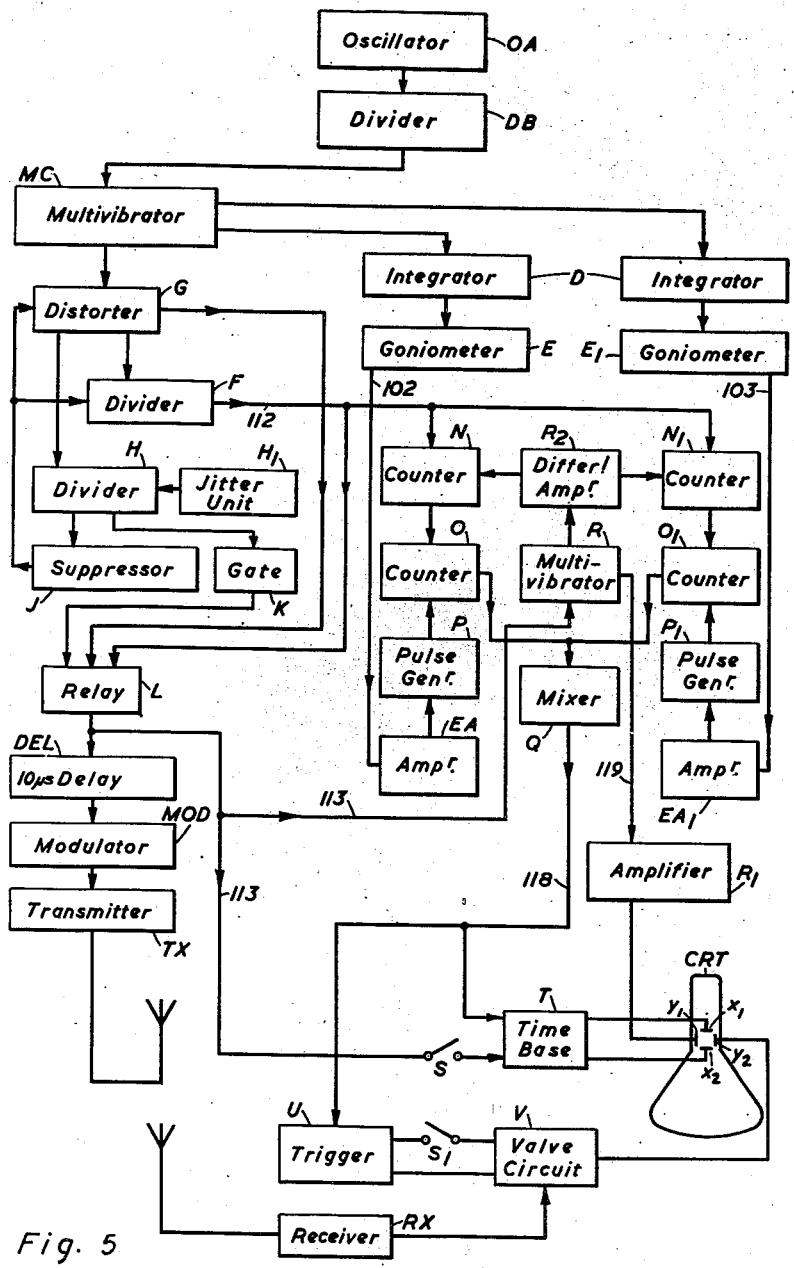
Figure 5 is a block diagram of units representing the main elements of a preferred embodiment of navigating equipment for use in a mobile craft such as an aircraft.

Figures 8, 9a, 9b, 10a, 10b, 11a, and 11b are detailed circuit diagrams of certain of the various units included in Figure 5.

Figure 12:
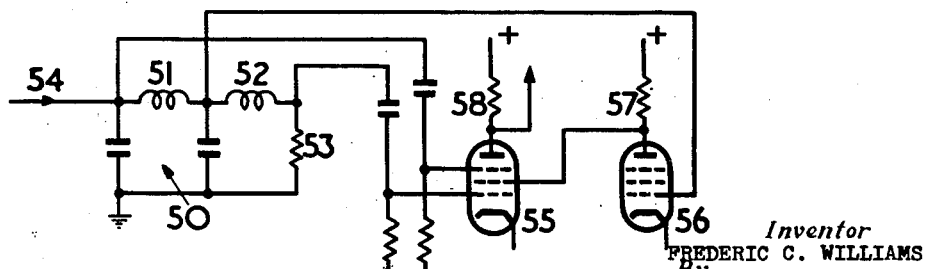

Figure 12 is a schematic diagram of one arrangement for controlling a receiving/transmitting station in such manner that it will radiate a response signal only upon receipt of an interrogating signal of predetermined characteristic form.

Figure 1:
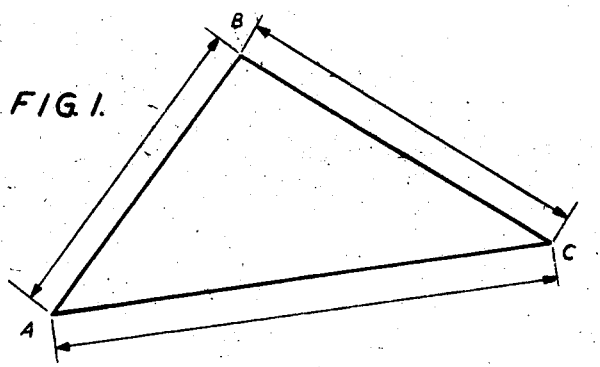
Figures 1, 2 and 3 are explanatory diagrams illustrating the use of the invention.

Referring first to Figure 1 of the drawings, A and B denote two combined receiving and transmitting stations located at known geographical positions some considerable distance apart, e. g. about 100 miles. Each station is designed to be capable of transmitting a response signal upon receipt by the associated receiving equipment of an interrogating signal radiated by a distant station, for instance, an aircraft located at the point C.

The signals employed both for interrogation of and response by the stations A and B are preferably of pulse form, i. e. each signal consisting of one or more periods of transmission each of short time duration, say, one-half to twenty microseconds separated, when more than one period is used, by a spacing interval of similar order, and each signal repetition being separated by a relatively long time interval of, say, one to twenty milliseconds during which time the transmitted power or carrier wave is at zero or substantially zero level.

The response signals radiated by the stations A and B should be of considerable power in order that they may be received at reliable strength at the distances, say 500 miles or more, over which it is intended they should assist navigation. The signals emitted by each station A and B are given characteristic forms by which the identity of the transmitting station may be recognised. This may be effected by suitable variation of the number of individual pulses in each signal, by variation of the time-duration or "pulse-width" of some or all the radiated pulses or by variation of the spacing between the individual pulses of each signal (where each signal comprises more than one pulse) or by combination of any of the above means.

The characteristic response signals by stations A and B are given only upon the receipt of an interrogating signal from the station C by the associated receiving equipment and it is preferable, for security purposes and to avoid overloading by extraneous signals, to arrange that the said receiving transmitter is made operative in response only to a selected special form of interrogating signal to the exclusion of all others. Such special interrogating signal may be made characteristic in similar manner to that already described in connection with the transmitted signals from stations A and B.

In addition to the special form of the signals transmitted from stations A and B it may be arranged that such signals are radiated only after a pre-determined time-interval following reception of an interrogating signal. The operator at the distant station C must, of course, be acquainted with the value of such delay time-interval in order that he may make due allowance therefor in calculating his position from the indications received by him.

General information on simple forms of such receiving and transmitting "beacon" stations may be found in co-pending application Serial No. 692,085 while indication as to one manner in which the preferred selective interrogation may be effected will be given later.

The equipment required at the mobile station C may, in its simplest form, follow the lines of a normal radio-location device employing a cathode ray tube visual indicator. Thus the equipment may comprise a cathode ray tube and a time-base circuit arranged to produce a time-base trace upon the cathode-ray-tube which commences its traverse a little before the radiation of each interrogating signal by the associated transmitter with which it is interlocked in known manner. The time-base would, in this simple arrangement, be arranged to have a duration equal to the longest range required whereby the transmitted interrogation signal and each of the response signals from stations A and B are displayed simultaneously at positions along said trace corresponding to the time-intervals between interrogation and reply. By the provision, either of a suitably graduated fixed scale or of additional marker signals along the trace at intervals representing suitable units of range, it is possible to measure the indicated range of each station A and B from the interrogating station C.

Referring again to Figure 1, if the navigator of an aircraft at C using the equipment outlined above observes the reply times or equivalent ranges on the cathode ray tube of each of the characteristic response signals from stations A and B, he has at once, provided no time delay has been introduced at station A or B, a direct measure of the distances C—A and C—B and knowing the geographical location of the points A and B, can at once fix his position in space relatively thereto. There will, of course, be two possible positions but normally sufficient information from other navigational sources will be available to resolve which is correct. Alternatively resolution may be effected by directional reception and/or transmission.

If either station A or B is arranged to introduce a time-delay before reply, suitable correction must be made to the indicated ranges to obtain the true distances C—A, C—B.

Figure 2:
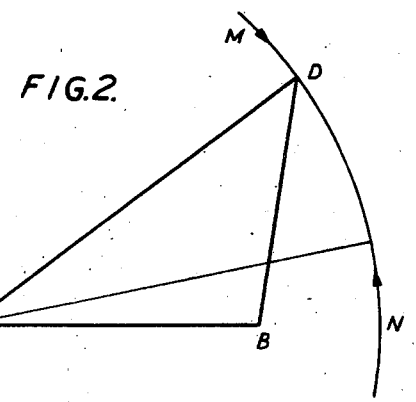

Figure 2 illustrates an alternative method of use, whereby the mobile craft may be navigated to a pre-determined point D by following a circular approach path such as M—D or N—D which the navigator maintains by keeping the indicated response time-interval or range of the station A at the appropriate fixed value. By simultaneously watching the varying time interval or range of the signals from station B he will be able to fix the instant of arrival of the craft at D by coincidence of such time-interval with the known distance D—B.

Figure 3:
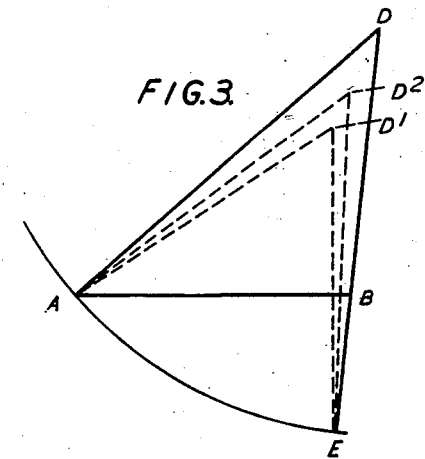

In the further method of using the invention as illustrated in Figure 3, a circle is drawn from point D, representing a selected destination, through a point A representing the more distant "beacon" station so as to cut an extension of the line D—B at a point E. A fixed time-delay equivalent to that required for radio wave propagation through twice the distance B—E is now introduced at the beacon station B between the instant of reception of the interrogating signal and the radiation of the response signal. The mobile craft can now be navigated along an approach course such as D1, D2 by keeping the two time intervals or ranges indicated by the mobile craft equipment, at equal values until they each coincide with the distance A—D, thus indicating arrival at the chosen destination D.

The response signals from the "beacon" stations are preferably radiated on a different carrier frequency from that used by the mobile craft for interrogation so that each ground receiver is tuned to the mobile transmitter and vice-versa. This helps to reduce mutual interference when several craft are being navigated by the same ground stations. It is still possible, however, for the visual indicator on one craft to show spurious signals by receiving response pulses intended for a nearby craft. To minimise this source of confusion, a deliberate wobble or "jitter" may be superposed on the normal pulse repetition frequency of the mobile transmitter. Since the time-base trace on which the signals are measured is always initiated in locked time-relationship with the mobile transmitter, the appropriate signals received from the ground stations will appear steady in spite of the superposed wobble. Spurious signals, which will be unlocked to the wobble, will flutter or "jitter" on the screen and will consequently show more faintly and may readily be identified and ignored.

Figure 4:
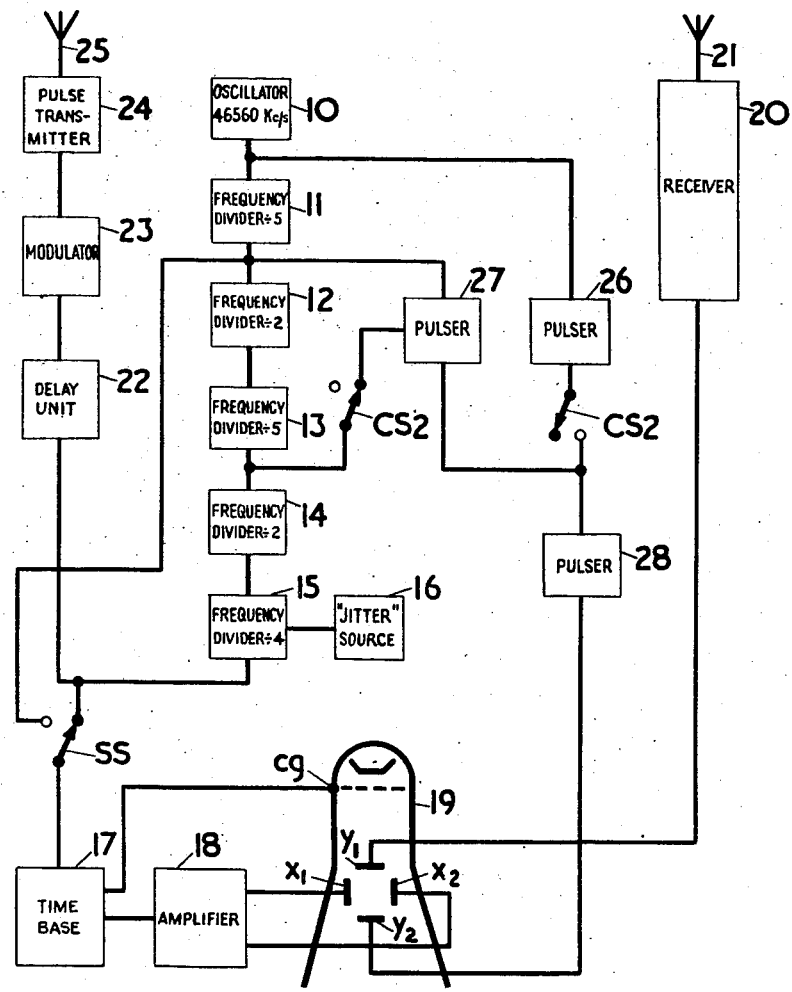
Figure 4 illustrates in block diagram form a simplified embodiment of navigating equipment for use in a mobile craft.

Figure 4 illustrates in block schematic form a simplified example of the equipment necessary at the mobile station. In this drawing 10 indicates a crystal controlled master oscillator of any suitable form providing an output at 46.560 kc./s. This is reduced to 9312 c./s. in divider unit 11 before being further reduced to 931.2 c./s. by passage through further divider units 12 and 13 which effect division by ratios of 2 and 5 respectively. The 931.2 c./s. output from unit 13 is further reduced to 465.6 c./s. by unit 14 before being applied to unit 15. This latter unit is arranged normally to have a division ratio of 4 to provide an output at 116.4 c./s. If necessary, however, intentional "jitter" can be imposed by the irregular alteration of the division ratio of unit 15 from one of 4 to one of 5. This may be effected by feeding into unit 15 a varying voltage from a source 16. The divider stage 15, as well as the previous divider stages, may conveniently be of the blocking oscillator type in which case the varying jitter voltage may be arranged to apply a suitable voltage to one of the oscillator valve electrodes in such manner as to delay the recovery time whereby a further input cycle is necessary at times to raise the value to the squegging level.

The output from divider unit 15 either at 116.4 c./s. or "jittered" if occasion demands, is applied by way of switch SS to a time-base generating circuit 17, again of any suitable known form, to produce a suitable saw-tooth output waveform which, after suitable amplification and conversion to push-pull form in unit 18, is applied to the deflecting plates $x1$ and $x2$ of a cathode ray tube 19 so as to provide a time-base on the cathode ray tube running in synchronism with the output from unit 15. A suitable voltage for effecting "black-out" of the tube beam during the flyback period of each time-base scan is also derived, in known manner, within the time-base circuit 17 and is applied to the control grid $cg$ of the cathode ray tube 19.

The output from unit 15 is also applied through a delay unit 22 to the modulator circuits 23 of a pulse transmitter 24 feeding an aerial 25 so as to cause transmission of an interrogating signal for every cycle of the output from unit 15, i. e. for every time-base scan on the cathode ray tube 19. The delay unit 22, which may be a suitable electrical delay network of known form, serves to impose a small delay of, say, 10 microseconds, whereby the transmitted signal always occurs at a small and known time interval after the beginning of each time-base scan.

20 denotes a suitable sensitive receiver of, say, the superheterodyne type, fed by aerial 21 and supplying its signal output to a deflector plate $y1$ of the cathode ray tube 19 whereby both the transmitted signals from aerial 25 together with those received in response thereto from distant "beacon" stations such as that at A and B of Figure 1, will cause transverse deflection of the time base trace of the cathode ray tube 19. As a result of such arrangement each time base scan will present a deflection due to the outgoing interrogating pulse at a point close to its starting point followed by two further deflections due, respectively, to the response signals from "beacon" stations A and B and displaced from such transmitted pulse signal along the time-base scan by distances which represent, with relation to the time-base speed, the time-intervals or ranges of the stations A and B.

Measurement of the above time-intervals or ranges may be effected by means of a fixed scale bearing markings suitably related to the time-base scanning speed. More conveniently, however, the ranges may be read by reference to a series of calibration markers applied to the time-base trace itself. These may be derived as follows: The 9312 c./s. output from unit 11 is applied to a distorter-amplifier valve 27 which provides an output pulsed waveform of 9312 c. p. s. frequency. This is applied to a further unit 28 which serves by suitable amplification and pulse shaping arrangements of known form to produce a series of sharp narrow pulses which are applied to the deflector plate $y2$ of the cathode ray tube 19 to cause the formation of a series of narrow pip-like deflections of the trace in a direction opposite to that produced by incoming signals. Since each interval between such marker pips represents $\frac{1}{9312}$ of a second which, in turn, is equal to an out and return path of approx. 20 miles or a range of 10 miles, assessment of the range of each "beacon" response from the transmitted pulse may be made without difficulty.

To facilitate counting of the 10 mile marker pips at long ranges they may be divided into groups of ten by the provision of further marker pips derived by feeding the 931.2 c./s. output from unit 13 through switch CS2 to the valve 27 and from this through unit 28 to the tube 19. These further marker pips are conveniently arranged to be of greater amplitude than the 10 mile marker pips.

Similarly to facilitate more accurate measurement each period between adjacent 10 mile marker pips may be subdivided into five 2-mile portions by the provision of further marker-pips derived from the 46.560 kc./s. output from unit 10 and fed by way of an amplifier-distorter valve 26 similar to that of 27 and thence by way of switch CS1 to the unit 28 and so to the tube. These pips may be of lesser amplitude than the 10 mile marker pips.

Normally the limitation of size or trace length imposed by the physical dimensions of the tube 19 renders accurate range measurement by means of the last-mentioned marker pips impracticable if the trace has to extend over a time period representing several hundred miles. This difficulty may be relieved by the provision of a higher-speed time-base, provided in the embodiment shown by operation of the switch SS. With this switch in the opposite position to that shown the time-base circuits 17 are triggered by the 9312 c./s. output from unit 11 instead of the output from unit 15. By suitable adjustments of the time-base circuit parameters, effected by switching means ganged to the switch SS, the time-base now provided is one of 10 miles length. Although repeated at 9312 c./s., each trace is rigidly locked to its predecessors by virtue of its derivation from the master oscillator 10 and the range of the received signals, which now appear however only on one trace in every 80, can be more accurately assessed by reference to the 46.560 kc./s. marker pips which are now readily discernible.

The above described simplified arrangement suffers from certain operational disadvantages among which are:

(a) Difficulty in providing a time-base scan representing long ranges of the order of say 500 miles or more without serious loss of accuracy or risk of error in range measurement due to cramping of the range scale or markers.

(b) The necessity for close scrutiny of the time base when reading and the making of mental or written notes of the approximate range readings before changing to the higher speed time-base.

(c) The necessity of subtracting the range of the outgoing interrogation pulse from that recorded for the response signals.

(d) The simultaneous presentation of each response on the same trace with consequent risk of confusion.

These disadvantages are obviated by the further and preferred embodiment now to be described with reference to Figures 5 to 11 of the drawings.

Before proceeding with a detailed description of the said embodiment reference will first be made to the diagrams of Figure 6 with a view to explaining a number of fundamental features of the apparatus. In this figure, diagram (a) represents a time/signal-strength graph of two consecutive interrogation signals and received responses from two stations such as A and B already referred to. At a time-interval $t1$ after the radiation of each interrogation signal J there will occur a response signal $j1$ from station A and after a time-interval $t2$ (again measured from signal J) a second response signal $j2$ from station B. In the example shown these occur at time-intervals of 2800 microseconds and 6183 microseconds respectively corresponding to ranges of 420 and 930 kilometres.

The two time-intervals which require to be measured could be displayed upon a single time-base as shown in diagram (b) and following the scheme already outlined in connection with Figure 5 by commencing the time-base scan a small time-period $z$ before the radiation of the interrogation pulse. Such an arrangement has the disadvantages already enumerated.

In the preferred embodiment to be described the above difficulties are overcome by making the time-base scan equal to a much shorter time-interval or range, say one of 150 kms. thereby allowing expansion of all signal indications thereon. If such a time-base is started at the same instant as the time-base of diagram (b) it will clearly show only the first 150 kms. of the possible range of responses. Arrangements are therefore provided whereby its commencement may be delayed by an adjustable known time-interval. By this means the time base may be caused to display any 150 km. stretch of the complete time-base range and if adjusted as shown at $c2$ will display the response $j1$ or alternatively if adjusted to a position such as $c3$, will display the response $j2$. It will be noted that the outgoing signal J is no longer displayed. If, however, the trace-delay is so adjusted, as shown at $c4$ and $c5$, that the response signal $j1$ or $j2$ lies at the distance $z$ from the point of trace commencement (which will be constant upon the indicator screen) then the delay device setting will give an indication equal, within the limits of setting accuracy of the operator, to the time-interval or range $t1$ or $t2$ respectively of the signal being observed. More accurate means of setting are provided but will be referred to later.

Such an arrangement has the disadvantage that only one 150 km. section of the complete trace can be covered at any one time. To overcome this a second delay device is arranged in a time base triggering channel parallel with the first and combined with arrangements whereby the two channels are used alternately with successive interrogation signals while simultaneously the scanning plane of the indicator tube beam is displaced to form two separate traces, one corresponding to one delayed time-base and operative after one outgoing signal and the other corresponding to the second delayed time-base and operative after the next following outgoing signal and so on alternately. This alternation occurs with sufficient rapidity to maintain simultaneous visual indication. Diagram (d) illustrates in similar form to diagram (b) what now occurs while (e) is a representation of the indicator tube screen.

To provide for accurate setting of the time-delay devices use is made of auxiliary higher speed time-bases corresponding to the first few kms. (e. g. twenty kms.) of each of the delayed traces above described. These are displayed as an alternative final-setting display each alongside a similar length of a further trace corresponding to the true beginning of each trace-period which will, of course, include the outgoing interrogation signal J. By reversal of deflection direction of the time-delayed traces under these conditions a double back-to-back presentation is provided as shown at diagram (g), the related components of which are indicated in heavy full lines in diagram (f) which is similar in form to diagram (d).

The purpose of the stepped region $e1$ of the traces on display (e) is to mark-off those portions which will be displayed on the higher speed time-base when brought into use. The operator thus first adjusts each time delay device to bring the responses $j1$ and $j2$ into the stepped region of their appropriate traces using display (e) and then switches to display (g) and after alignment of the response signals with the outgoing signals J, reads the time delay or range settings directly from the calibrations of the delay device. The step $e1$ also serves, upon reversal of deflection direction in the display (g) to provide the small separation $e2$ between the two associated high speed traces.

The delaying of each time-base is conveniently effected by the provision of two sets of calibrated controls, one of which can impose any selected number of unit delays each equal to, say, 100 kms. as indicated at C6, C7 and C2 in diagram (c) while a second delay control smoothly adjustable over a range at least equal to one unit of the first delay device e. g. from zero to over 100 kms. in the case quoted, serves to add to the chosen first number of 100 km. units such delay as is necessary to effect precise alignment of the signals in the manner described.

In the embodiment now to be described the initiation of each interrogation cycle including the commencement of the time-base period and the triggering of the interrogation transmitter together with the delayed initiation of each displayed time-base section are controlled by a continuously operating master oscillator.

Referring now to Figure 5 which shows in block schematic form the preferred embodiment for use in a mobile craft, OA denotes a crystal-controlled master oscillator stabilized at a frequency of 120 kc./s. and serving as the master frequency control for the whole system. The sine-wave output therefrom is fed to a divider stage DB whose division ratio is 2:1 and which provides an output waveform consisting of sharp pulses at intervals of 16.66 microseconds which is applied to a four-stage multivibrator circuit MC. This circuit, to be described in detail later, provides four separate square-wave outputs, each having a cycle period of 66.66 μsecs. and being 90° phase displaced with respect to the next. Each square wave is applied, through integrating circuits included in units D which convert each wave to triangular form, to separate fixed vanes or quadrants of a pair of condenser-goniometers E, E1. As described in detail later, these capacity goniometers each provide, from their rotors, an output waveform of substantially triangular form which changes smoothly and continuously in phase, with respect to a chosen reference phase, e. g. the input phase to one particular fixed condenser vane, as the rotor is rotated in one direction or the other. The said rotors are arranged to be continuously movable over a plurality of, say 15, revolutions and are each geared to a separate potentiometer which traverses its range of movement once during the complete operative range of its associated condenser-goniometer rotor. As above stated the cycle period of each input square wave and therefore of the output triangular wave is equal to 66.66 μsecs. which is equivalent to a "range" period of 10 kilometers. If therefore the displayed time-base commencement is controlled by the phase-variable output from a condenser-goniometer rotor, it may be made continuously variable through units of 10 kilometers for each complete revolution of the rotor. Each goniometer is provided with suitable means for indicating the range equivalent of the angular movement imparted thereto.

One of the four output square waveforms provided by multivibrator unit MC is applied to unit G which, when operative, functions as a distorter-amplifier providing an output waveform comprising a series of sharp negative-going pulses each coincident in timing with a negative going edge of the square-waveform applied thereto, i. e. pulses at 66.66 μsec. intervals. This unit G can be suppressed when required by the application thereto of a control potential from unit J. This pulse output from unit G is applied to units F and H. Unit F, when operative serves as a divider stage with a ratio of 10:1 and provides an output waveform comprising a series of sharp-negative-going pulses at 666.6 μsec. intervals (equivalent to a "range" time of 100 kms.). This unit F can, however, also be suppressed by the application thereto of a control potential from unit J. When this is affected the counting cycle then in progress is terminated and the circuit restored to a condition in which it commences a fresh counting cycle on receipt of the first pulse from unit G subsequent to the removal of the suppression potential.

Unit H, to which the 66.66 μsec. pulses from unit G are also applied, is a further divider stage with a ratio of about 150:1. The precise ratio is variable under the influence of a fluctuating control potential provided by the jitter unit H1, and may be anything from, say, 140:1 to 160:1. The output waveform from this unit H1 consists of pulses at intervals which are irregular but of the order of 10 milliseconds. These output pulses are applied to units J and K.

Unit J operates as a suppressor pulse generator providing a negative-going square output pulse of some 233 μsecs. duration every time it is triggered by a pulse from unit H. Such output pulses are applied as a control potential to units G and F where, as already described, they cause suspension of operation and, in the case of unit F, the restoration of the circuit to the appropriate condition to commence a fresh counting cycle.

Unit K operates as a gate valve and upon being tripped by each pulse from unit H, provides an extended control pulse which is applied to unit L.

Unit L operates as a relaxation relay circuit which is normally quiescent but which may be triggered by the suitable coincidence of potential inputs from units, K, F and G. Such coincidence occurs at the instant of the first sharp pulse delivered by unit G following the suppression period enforced by unit J which, in turn follows the jittered pulse output from unit H. In consequence unit L provides an output waveform, comprising a series of steep-sided short and positive-going pulses each following a pulse from unit H and having its leading edge in precise time coincidence with the commencement of a fresh counting cycle by unit F. This output from unit L is applied by way of delay unit DEL where a delay of 10 μsecs. is imposed, to modulation unit MOD which controls a pulse transmitter TX whereby an interrogating pulse is radiated 10 μsecs. after each pulse from unit L. The same pulsed output waveform from unit L is applied also to unit R and, under the higher-speed time-base display conditions, to unit T.

Unit R operates as a further multivibrator unit providing a square-wave output of one half the frequency of pulses provided by the unit L, i. e. a positive-going wave portion initiated by one pulse from unit L and a negative-going wave portion by the next pulse from unit L and so on. This waveform is applied through an amplifier unit R1 to one, e. g. horizontal, deflector plate of the indicator cathode-ray tube CRT where it serves to displace the traces associated with alternate transmitted pulses to right and left respectively. The same waveform from unit R is also applied to a differentiating and amplifying circuit R2 which provides triggering pulses alternately to two counting circuits N, N1, forming respectively parts of two parallel circuits comprising units N, O, and P and N1, O1 and P1. The output waveform from unit F, i. e. pulses at 666.6 μsec. intervals, is also applied to each of the circuits N, N1. As each circuit is identical in construction, one only will be described.

Unit N comprises a form of pulse counting circuit which can, after the application of an initial triggering potential be arranged to execute a counting cycle which provides an output pulse after any chosen number of, say, zero to ten pulses according to the setting of a manual control. Thereafter the circuit remains quiescent until retriggered. The requisite initial triggering potential for initiating each counting cycle is provided by each pulse from unit R2, which pulse, occurs just prior to each alternate interrogation signal. The input pulses which are counted are those applied from unit F at spacing intervals of 666.6 μsecs. (or "range" of 100 kilometers). As a result, this unit N provides an output pulse occurring at an instant after each input triggering pulse from unit R2 which has a "range" time of 0, 100, 200, 300, . . . 1000 kms. according to its manual control setting. The latter is calibrated in such 100 km. steps. This time delayed output from unit N is applied as a triggering input to a unit O which operates as a further variable counting circuit of somewhat similar form to unit N.

The pulse waveform to be counted by the unit O is provided from the goniometer E by application of its triangular waveform through an amplifier EA to unit P which generates a pulse every time the triangular waveform passes through a chosen level, e. g. zero volts in say, a positive direction. In consequence a series of pulses at 66.66 μsec. intervals are provided, the timing of which, relative to the 66.66 μsec. pulses fed to the divider circuit F, is a measure of the angular setting of the goniometer E.

The number of the pulses counted by unit O after triggering by unit N is set by the aforesaid potentiometer ganged to the goniometer E. The final result is an output pulse from unit O delivered at an instant after the pulse from unit L which initiated an interrogation signal, governed by—first, the setting of the control of unit N (i. e. according to the chosen number of 100 km. steps); secondly, by the setting of the potentiometer associated with unit O and ganged to goniometer E (i. e. according to the number of whole turns or 10 km. steps of the goniometer) and finally, in accordance with the precise angular setting of the goniometer (i. e. in accordance with the fractional setting within the 10 km. range of the goniometer).

The precisely timed output from unit O is fed (together with a similar waveform from unit O1, which is, of course, controlled by the setting of the control of unit N1 in conjunction with the second phase adjuster E1) through a mixer unit Q to time-base generating circuits T which provide, for each input pulse, a push-pull deflecting waveform, suitable for a range of, say 150 kms., to the vertical deflecting plates of the tube CRT. By reason of the simultaneously applied waveform from unit R1 the result will be, as shown in diagram (e) of Figure 6, two parallel but displaced traces, one delayed after its associated interrogation signals by an amount set by unit N and goniometer E and the other delayed after its associated (i. e. alternating to those of the first) interrogation signals by an amount set by unit N1 and goniometer E1.

The output from unit Q is also applied to unit U which operates as a trigger device producing for each applied pulse a short output pulse equal in length to say 10 kms. range. These pulses are fed to a valve circuit V which under the normal display conditions as in diagram (e) Fig. 6 causes their application to the opposite deflector plate of the tube CRT to that supplied with the trace-spacing waveform from unit R1, to produce the short step at the beginning of each trace as already described. The received signals are also fed to the valve circuit V from receiver RX to cause appropriate deflection of the traces.

Switches S and S1 are ganged and serve to convert the display from that shown in diagram (e) to that of diagram (g) Fig. 6. When moved into the opposite position to that shown the time-base circuits T are simultaneously adjusted to generate a much faster-time-base wave form equal to, say, 10 kms. for each input pulse supplied thereto.

Since, in this opposite position of the switches S, S1, the time base circuit T has the pulsed waveform output from unit L applied thereto as well as the waveform output from unit Q, there will be four input pulses to the time-base circuit T and consequently four separate trace waveforms generated for each complete cycle of display involving two interrogation pulse radiations; one from unit L just prior to the triggering of the associated transmitter, second from unit Q after a time-delay set by units E and N, a third from unit L just prior to the next transmitter triggering and a fourth from unit Q after a delay set by units E1 and N1. The first two traces will occur when the output from unit R1 is displacing the tube beam to one side and the latter two traces when the beam is displaced to the opposite side. The output from unit Q is applied as before to unit U whereby a step-producing voltage is generated as before for the second and fourth traces. This is now also applied, however, by way of switch S1 to the valve circuit V whereby the latter effects (in a manner to be described later) reversal of sign of its output during these second and fourth traces with the resultant display shown in diagram (g) of Figure 6.

The various units already referred to in Fig. 5 will now be described in greater detail, where necessary, with reference to Figures 8, 9a, 9b, 10a, 10b, 11a, and 11b.

Figure 7A:
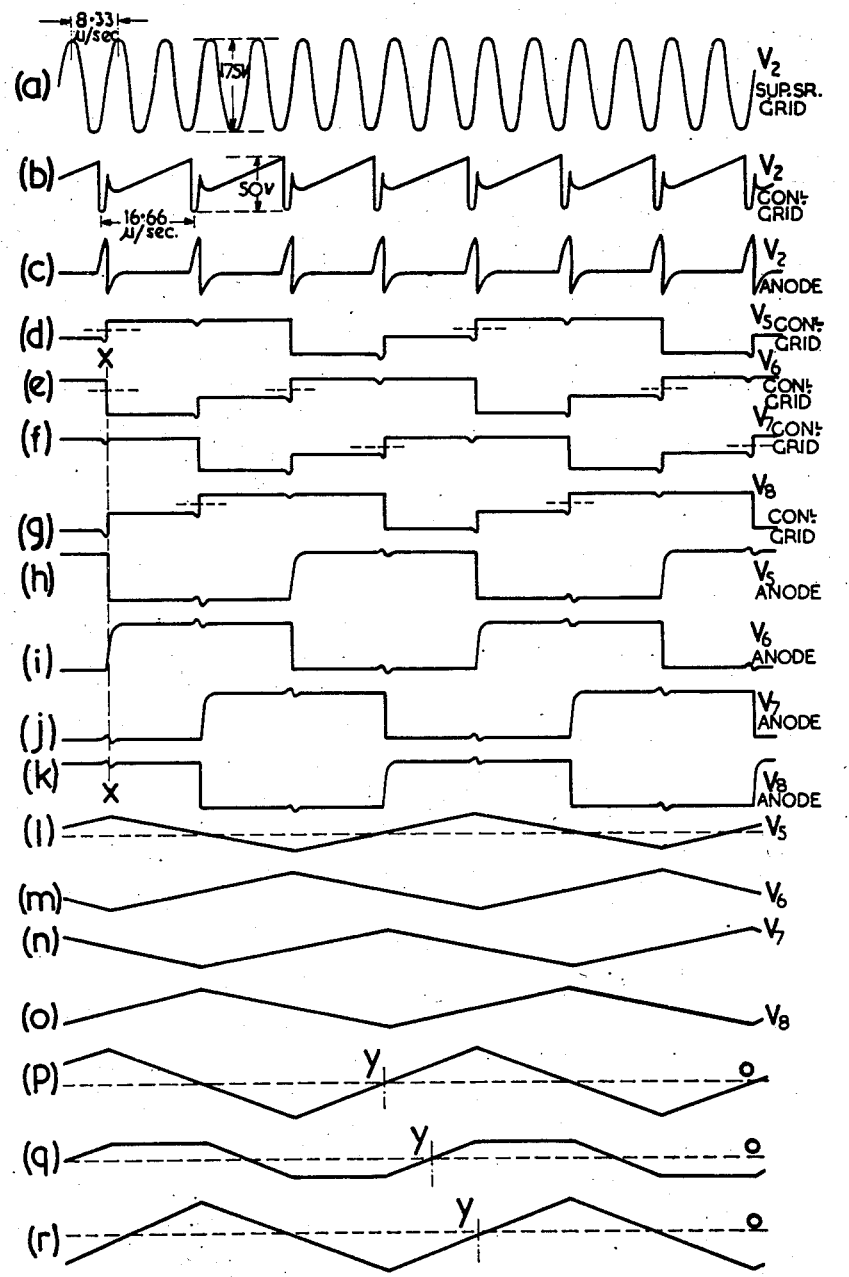
Figure 8:
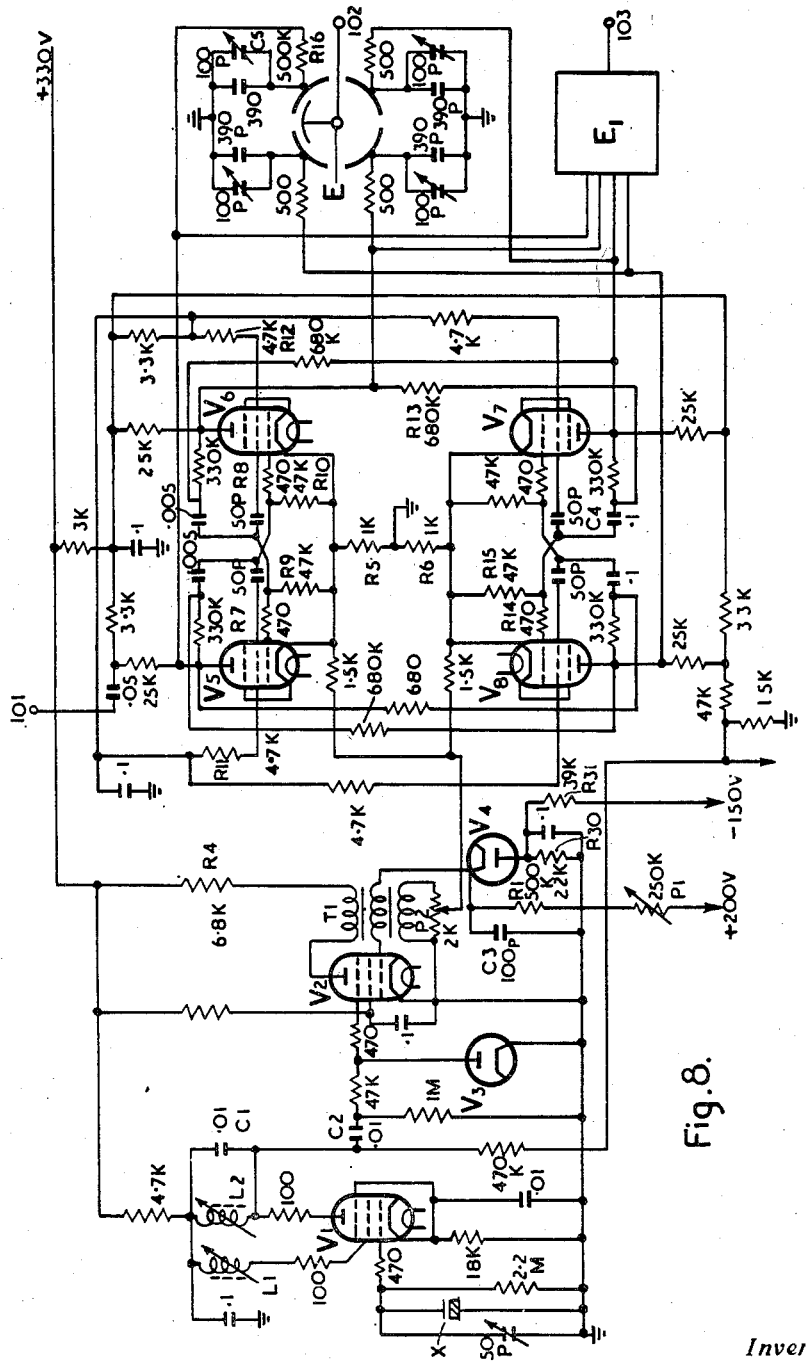

Unit OA comprises valve V1, Fig. 8, and constitutes a stable frequency oscillator controlled by crystal X and resonant circuit L2, C1, to provide a sine wave output at a frequency of 120 kcs., indicated in diagram (a) Fig. 7a. The amplitude of this output oscillator is, say, 175 v. peak to peak and is applied by way of condenser C2 to unit DB.

Unit DB comprises the valves V2, V3 and V4, Fig. 8. In the operation of this divider stage the 120 kc./s. sine-wave output from the oscillator OA is applied to the suppressor grid of valve V2. Diode V3 connected between the suppressor grid of V2 and earth prevents the potential of this grid rising above earth potential.

Valve V2 has its control grid circuit tightly coupled to its anode by means of transformer T1, the grid winding of the latter being taken to earth through condenser C3 and by way of a grid-leak chain R1, P1 to source of positive potential of, say, 200 v. Diode valve V4 whose anode potential is held at, say, −50 v. derived from the potentiometer network of resistance R30, R31, prevents the grid-connected terminal of condenser C3 from falling below −50 v.

Assuming the control grid of V2 to be at earth potential and drawing grid current due to the +ve potential applied thereto and assuming also that the suppressor grid is cut-off by the applied sine-waveform from oscillator OA then, at some following instant, the suppressor grid will rise in potential to allow anode current to flow. The transformer T1 is so connected that increasing current in the anode winding causes the control grid to be driven positive and the resulting grid-current to effect charging of condenser C3 negatively.

The peak current drawn by V2 is limited by the valve and the anode resistance R4. When the anode current has risen to its maximum value and the induced voltage applied to the control-grid ceases, C3 will be left charged −ve; this will tend to cut-off the valve and in turn the control grid will be driven still more −ve as the valve anode current falls due to the coupling in transformer T1. The −ve swing of the control grid will be caught at, say −50 v., by the diode V4 and thereafter the condenser C3 will charge up towards earth from the +ve potential source. Diagram (b) Figure 7a, illustrates the resultant control-grid voltage waveform while diagram (c) shows the related anode voltage waveform.

The rate of charge of C3 is adjusted (e. g. by P1) so that the control grid of V2 reaches earth potential just before the suppressor grid is released by the applied sine wave. The time-constant of the charging circuit is also of such value that, in conjunction with the value of applied +ve potential, the circuit counts the desired number of sine-wave cycles, i. e. two.

The pulsed anode waveform shown in diagram (c) Fig. 7a is taken from a third winding of the transformer T1 through the medium of potentiometer P2 which allows adjustment of its amplitude and is applied to the multivibrator unit MC.

The multivibrator unit MC comprises valves V5 to V8 Fig. 8, which are arranged as two multivibrator pairs V5, V6 and V7, V8 each supplied with the triggering input waveform from potentiometer P2 across resistors R5, R6 forming respectively a common cathode resistor for each pair of valves. The anodes and control grids of each valve pair are cross-connected by a series-connected resistance-capacity network as shown while the anode of each valve is in turn coupled to a tapping on the anode-grid cross-connecting network of its opposite equivalent in the other multivibrator pair in the manner shown.

The operation of this multivibrator is as follows. Referring to diagrams (d) to (k) of Figure 7a which shows the waveforms at the control grids and anodes of valves V5, V6, V7 and V8 respectively, and considering first the multivibrator pair V5, V6. Prior to the instant x in diagram (d) V5 is assumed cut off at its control grid and its anode potential is accordingly at a value approaching that of the HT supply, say +200 volts, see diagram (h). The arrival of a triggering pulse will raise V5 grid above cut-off level and will initiate space current. The resultant fall of anode potential is transmitted in the normal way to the grid of the opposite valve V6 which has hitherto been conducting but which is now driven towards cut-off. The consequent rise in anode potential of V6 is fed back to the grid of V5 to cause a further fall of its own anode potential and this is again transferred to the grid of V6 and so on to cause a rapid changeover of each valve in known manner.

Only a small fraction (say 20 volts) of the total anode voltage swing of each valve is fed to the opposite grid due to the values chosen for the respective feed and grid leak resistances R7, R8 and R9, R10 while the recovery time constant of the grid circuits is made very long compared with the interval between successive triggering pulses. In consequence the grid of V6 will be driven negatively by, say, 20 volts and will not materially alter its value before the arrival of the next triggering pulse. See diagram (e).

The additional feed-back circuits shown between the screen grid of one valve and the control grid of the opposite valve of each pair is provided to introduce extra feed-back so as to accelerate the changeover action and is made necessary by the necessarily large values of the anode to grid feed-back resistors and the small percentage of the total voltage swing made available at the opposite grid. Resistances R11 and R12 in the screen grid supply circuit of V5 and V6 respectively serve as load resistances for developing the required feed-back voltages.

The arrangement of valves V7 and V8 is substantially identical with that already described in connection with V5 and V6, the only difference being the variation in the time constant of each anode to grid feed-back circuit for a purpose which will be described later.

The rise in anode voltage of valve V6 at point x previously referred to is transmitted by way of resistor R13, condenser C4 and resistor R14 to the control grid of valve V8. By the chosen values of the resistor R13 and the grid leak R15 of V8 the proportion of the total anode voltage swing of V6 made available at the grid of V8 is approximately half (say 10 volts) of that fed to the opposite valve V5 of the first pair. V8 was previously completely cut off and as a result of the above described feed-back its control grid will be lifted by approximately 10 volts to a value which is, however, still below the cut-off level, see diagram (g). The opposite valve V7 of the pair will of course be conducting during this period.

Upon the arrival of the next following triggering pulse valve V5, which is already passing current, will be unaffected while the valve V6 whose grid has been lowered to the maximum amount will likewise be unaffected since the triggering pulse is insufficient to raise the grid voltage above cut-off value, but valve V8 which has already been partially prepared or restored by feed-back from V6 will now have its control grid raised above cut-off to initiate the change-over cycle within the pair V7, V8 substantially in the manner already described in connection with V5 and V6, see diagrams (f) and (g).

This change-over cycle in V7, V8 will cause the feed-back to the grid of V6 of a 10 volt rise in similar manner to that already described in connection with V8 and will accordingly raise the grid potential of this valve V6 towards but not as far as cut-off level whereby it will be triggered by the next following triggering pulse.

Subsequent pulses cause a repetition of events whereby each pair triggers on alternate pulses and at the same time primes the opposite multivibrator pair whereby the latter triggers on the intermediate pulses.

The larger time constant given to the anode-grid feed-back circuits of V7 and V8 compared with those of V5 and V6 serves to correct any tendency for one pair to pull into step with the other pair.

The anode output waveforms from each of the valves V5, V6, V7 and V8 (see diagrams h, i, j and k respectively) provide four substantially square waves at a frequency of one-quarter of that of the input triggering waveform i. e. 15 kc./s. and displaced in phase by 90 degrees on one another in the order V5, V8, V6 and V7.

A reduced-amplitude version of the output waveform from V5 is fed via lead 101 to unit G to be described later. Each of the anode output waveforms from valves V5 to V8 is applied through integrating circuits such as that shown by R16, C5 corresponding to units D of Figure 6 to separate fixed plates or quadrants of a capacity goniometer E corresponding to unit E of Figure 5. The rotor of the goniometer, which may be in the form of a single vane substantially identical with one fixed plate or quadrant, is capable of being moved into and out of register with each of the fixed plates in turn so as to give a straight-line capacity law between angular movement and the relative capacity between the rotor and the plate opposed to it and is connected by way of output lead 102 to unit EA to be described later. A second capacity goniometer E1 of identical construction corresponding to unit E1 of Figure 5 is likewise fed through similar circuits from the valves V5 to V8 and provides its output via lead 103 to unit EA1.

Diagrams (l) (m) (n) and (o) illustrate the input waveforms to each goniometer plate while diagrams (p) (q) and (r) show typical output waveforms from the goniometer rotor corresponding to different positions of the latter. As will be seen from these latter diagrams which correspond respectively to the conditions where the rotor completely overlaps the fixed plate supplied with wave-form l, equally overlaps the fixed plates supplied with waveform l and o and completely overlaps the fixed plate supplied with waveform o, the instant, such as y, at which the output waveform passes through the mean potential level in a +ve going direction is progressively altered as the rotor is moved. To the shafts of the rotors of these goniometers are geared potentiometers forming parts of the circuits of units U and O1 respectively to be described later. The gearing is such that, say, 15 complete revolutions of a goniometer rotor are necessary to traverse the associated potentiometer over its total range of adjustment.

Unit G comprises the valves V9 and V10, Fig. 9a, which are arranged to form a distorter-amplifier circuit. The input waveform to this unit is that of the anode output of valve V5 of unit MC shown in diagram (h) Fig. 7a and redrawn in diagram (i) Fig. 7b and comprising a symmetrical square-wave of time period 66.66 microseconds. This waveform is applied to control-grid of valve V9 by way of adjustable delay network L3 whose function is to allow suitable compensation for certain time delays which occur in the operation of the circuit. The resultant anode output waveform, comprising a similar but phase-inverted square wave, is shown in diagram (ii) Fig. 7b and is applied to the anode of diode V21 of unit L by way of condenser C6. A further output is drawn from the secondary winding of differentiating transformer T2 which is shunted by diode V10 whereby the resultant output waveform comprises a series of sharp negative-going pulses at 66.66 microsecond intervals as shown in diagram (iii) Fig. 7b, each negative-going pulse being coincident in timing with a negative-going edge of the input waveform. This output waveform is applied as a triggering control potential to valve V11 of unit F and by way of lead 105 to unit H.

For a purpose to be described later, the operation of this unit may be suppressed when necessary by the application of an appropriate negative potential to the suppressor grid of valve V9 by way of lead 110. When suppressed the anode voltage remains raised as shown at s in diagram (ii) while, of course, the input waveform (i) fails to produce any negative going pulse output across transformer T2 shown at s1 in diagram (iii).

Unit F comprises the valves V11, V12 and V13, Fig. 9a, arranged as a divider circuit of the kind described in my prior copending application entitled Electronic Relay Circuit Arrangements, filed July 21, 1947, Serial No. 762,375, now issued as U. S. Patent No. 2,549,874, and having a division ratio of 10. The input waveform applied by way of diode V12 consists of the negative-going pulses at 66.66 microsecond intervals from transformer T2 of unit G, shown in diagram (iii).

The screen grid output waveform of valve V11 shown in diagram (iv), consists of a series of square negative-going pulses whose trailing edges, marking the end of one counting cycle and the start of the next, synchronise with every tenth input pulse. This waveform, consisting of pulses at 666.6 microsecond intervals, is applied to the cathode of diode V21 of unit L. A differentiating transformer T3, connected in the screen-grid lead, provides a further output waveform comprising a negative-going and then a positive-going sharp pulse for every tenth input pulse, the later positive-going pulse being in synchronism with the input pulse which caused the triggering—see diagram (v). This waveform, hereinafter called the "decade waveform" and consisting of pulse pairs at 666.6 microsecond intervals is applied by way of lead 112 to units N and N1.

This unit is also capable of being suppressed when necessary by the application of an appropriate negative potential to the suppressor grid of valve V11 by way of lead 109. When suppressed the counting cycle then in progress is terminated and the screen-grid potential is lowered and remains lowered until the arrival of the next pulse of the input waveform following the removal of the suppression voltage. This is shown at s2 in diagram (iv).

Figure 9:
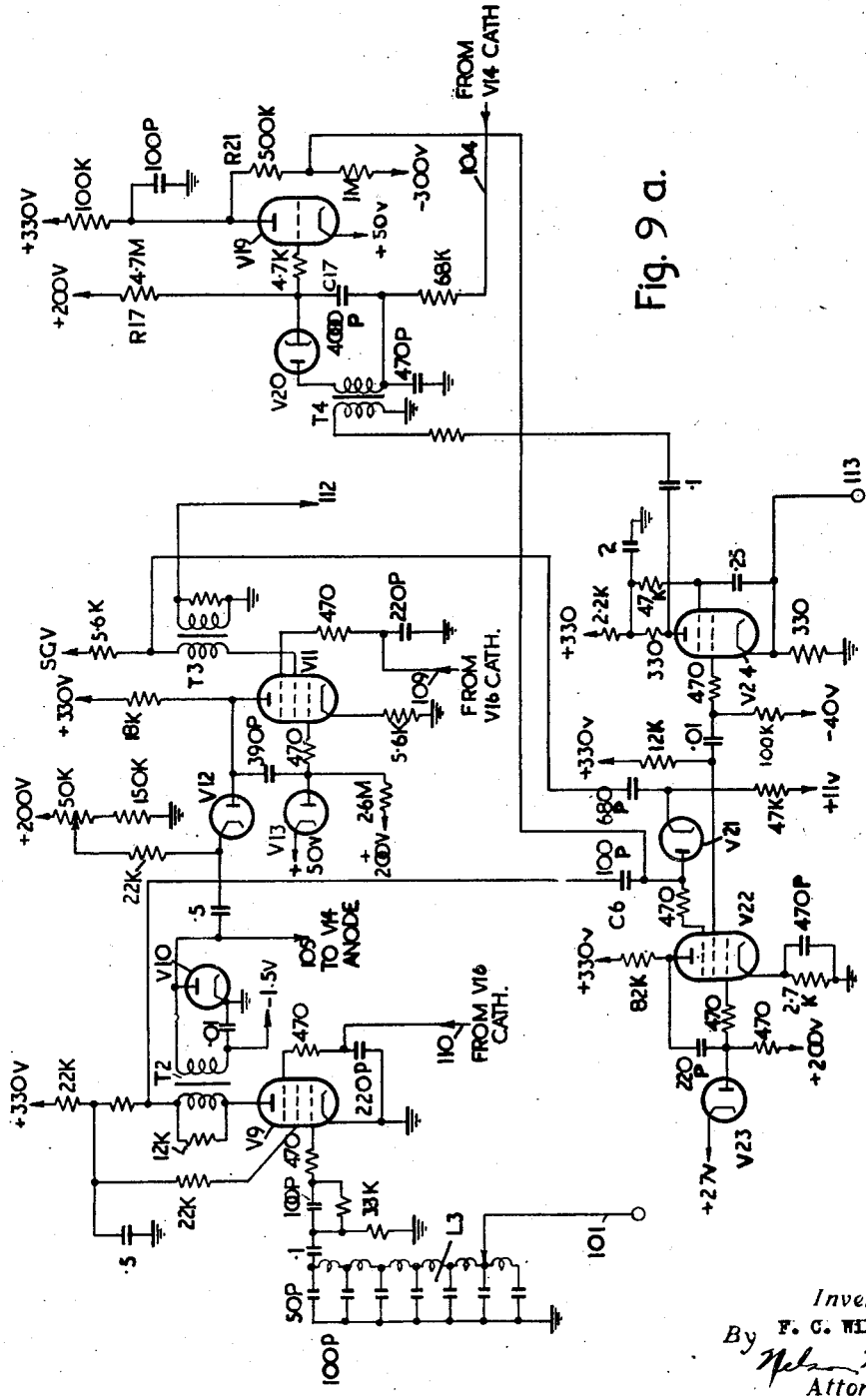
Figure 9B:
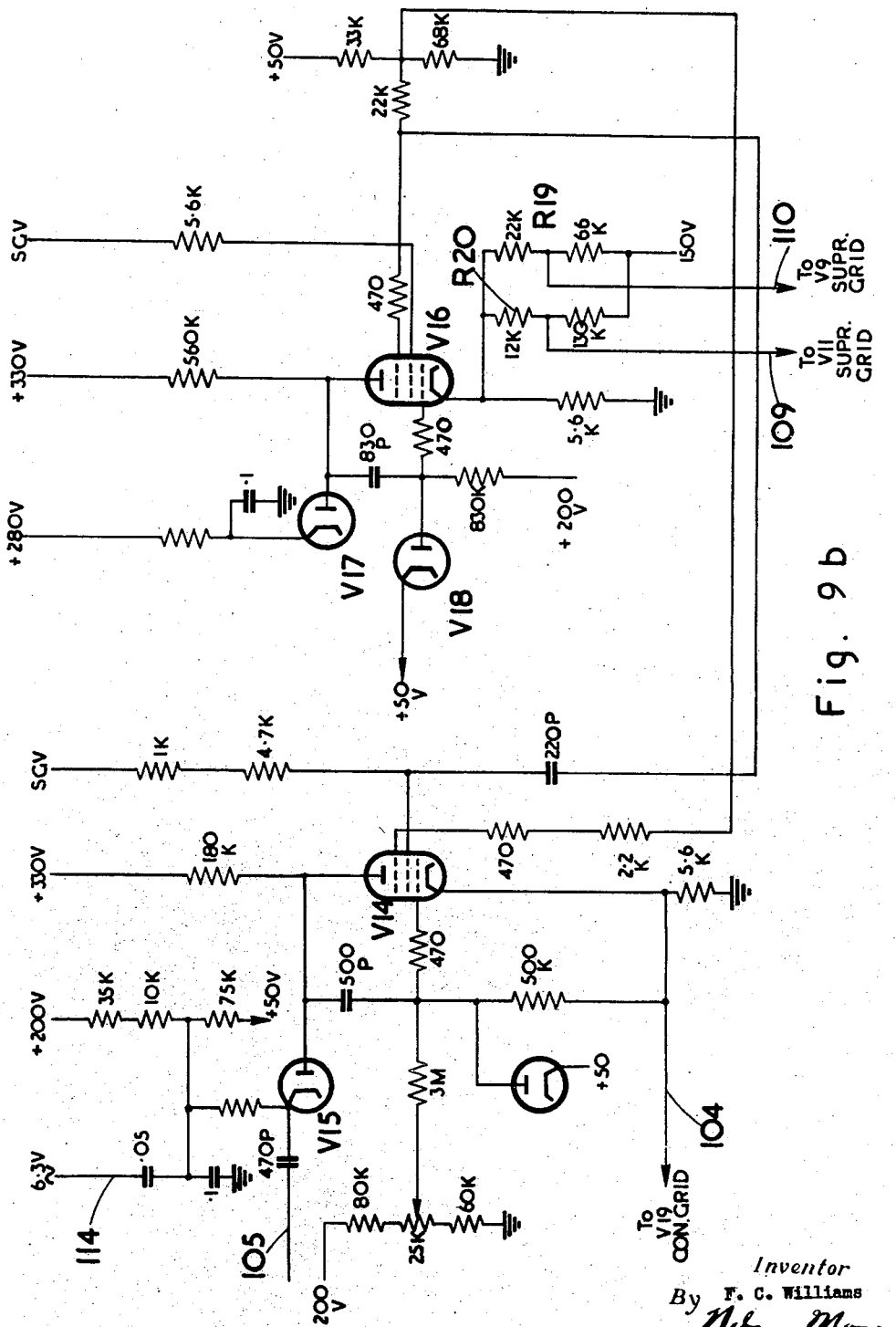

Unit H comprises the valves V14 and V15, Fig. 9b, arranged as a divider circuit of the kind described in my prior copending application entitled Electronic Relay Circuit Arrangements, filed July 21, 1947, Serial No. 762,375, now issued as U. S. Patent No. 2,549,874 and having a division ratio of approximately 150. The input waveform, applied by way of lead 105 and diode V15, consists of the negative-going pulses from transformer T2 of unit G, i. e. at 66.66 microsecond intervals as shown in diagram (iii). The output waveform at the cathode of valve V14 comprises a series of positive-going pulses at intervals of approximately 1— milliseconds as shown in diagram (vi). The trailing edge of each pulse coincides in timing with one of those of the input waveform (diagram iii).

The division ratio of this circuit is purposely made irregular for the purpose of jittering the interrogation pulses which are controlled thereby. This irregular division is effected by the supply of a small A. C. voltage by way of lead 114 to the cathode of diode V15 which controls the anode "catching" voltage of valve V14. By this means, which corresponds to the unit H1 of Figure 5, the division ratio may be varied fortuitously between values of, say, 140 and 160 as shown in dotted lines in diagram (vi).

The cathode output waveform is applied by way of lead 104 to valve V19 of unit K, while the screen-grid waveform, consisting of substantially similar positive-going pulses to those shown in diagram (vi) is applied to the suppressor-grid of valve V16 by unit J.

Unit J comprises valves V16, V17 and V18, Fig. 9b, which are arranged as a triggered circuit of the kind described in my prior copending application entitled Electronic Relay Circuit Arrangements, filed July 21, 1947, Serial No. 762,375. The waveform from the screen-grid of valve V14 of unit H is applied as a triggering input to the suppressor grid of valve V16. The trailing negative-going edge of each applied pulse triggers the circuit which thereafter takes about 233 microseconds to restore providing an output waveform at its cathode comprising a negative-going pulse commencing in synchronism with the trailing edge of each input pulse and lasting for 233 microseconds before restoring steeply to its normal level. This waveform, shown in diagram (*vii*), is applied, at appropriate amplitude levels determined by the separate potentiometer networks R19 and R20, to the suppressor-grids of valves V9 and V11 of units G and F respectively by way of leads 110 and 109, where, by virtue of the negative potential thus applied, the operation of the circuits comprising such valves is suspended, as shown at *s*, *s1* and *s2* in diagrams (*ii*), (*iii*) and (*v*), for a period of 233 microseconds immediately following each pulse provided by unit H, which, as already stated occur at time intervals which are irregular but of the order of 10 milli-seconds.

Unit K comprises the valves V19 and V20, Fig. 9*a*, arranged as a gate-pulse generating circuit. The valve V19 is normally taking heavy current due to the connection of its control-grid to the 200 volt positive supply line by way of resistor R17. The input waveform, consisting of that from the cathode of valve V14 of unit H, shown in diagram (*vi*) is applied to the control-grid of valve V19. The positive-going front of each applied pulse has no effect upon the anode current flow; the trailing negative-going edge of each applied pulse, however, causes the anode current to be cut-off. The time-constant of the circuit of condenser C17 and resistance R17 is long whereby such cut-off condition persists until the valve V19 is restored to its original heavy-current flow condition by a pulse from unit L applied by way of transformer T4. The resultant anode potential waveform is therefore that shown in diagram (*viii*), consisting of a series of steep positive-going pulses whose leading edges coincide with the trailing edges of the input pulses. This anode waveform is applied to the anode of diode V21 of unit L in addition to the anode waveform from valve V9 of unit G.

Unit L comprises the valves V21, V22, V23 and V24, Fig. 9*a*. Valves V21, V22, V23 are arranged as a relaxation relay circuit again of the kind described in my prior copending application entitled Electronic Relay Circuit Arrangements, filed July 21, 1947, Serial No. 762,375, now issued as U. S. Patent No. 2,549,874. This circuit is arranged to be triggered by the coincidence of appropriate potentials delivered to it from units F, G and K and provides, when so triggered, square positive-going pulses at intervals set by the irregular counting of around 10 milliseconds by unit H but in precisely timed relation to the 66.66 microsecond interval pulses delivered by unit G and also in precise timed relationship to the commencement of a fresh counting cycle by the divider unit F. This is effected as follows:

Valve V22 is normally passing screen current but is cut-off at its suppressor grid by virtue of the latter being held at a negative potential of, say, −46 v. by its connection to the network R21 associated with the anode circuit of valve V19 of unit K. Upon the operation of unit H at the end of each, approximately, 10 millisecond interval, the resultant cathode output waveform from valve V14 of unit H causes valve V19 of unit K to be cut-off as already described. The consequent raising of the anode potential of valve V19 results in the raising of the suppressor grid of valve V22 but only to the value, say +11 v., set by the bias voltage applied as shown to the cathode of the associated diode valve V21. This is insufficient to release the suppressor grid of valve V22 since the control-grid and the cathode of that valve are held at a still higher positive potential, say +27 v., by the bias voltage applied to the cathode of diode valve V23.

Simultaneously with the above operation of unit K by unit H, the latter has initiated the operation of unit J in the manner already described whereby the operation of valves V9 of unit G and V11 of unit F are suppressed also as already described. In consequence there is no output from either unit, the divider circuit of unit F being restored to its initial or zero counting condition. This state of affairs persists for about 233 microseconds i. e. the duration of the suppression pulse from unit J.

At the end of this suppression pulse period both units G and F are released and on the arrival of the next following negative-going edge of the input square-wave to unit G (diagram (*i*)) there will be provided the usual negative-going triggering pulse across the transformer T2 which, upon application to unit F will initiate the triggering of the latter to commence a fresh series of counting cycles. This instant is marked by the steep rise in the screen-grid potential of valve V11 of unit F and this rise is communicated as a differentiated positive-going pulse, to the cathode of diode V21 whereby the potential of the latter is lifted temporarily. In synchronism with such triggering of unit F, the rise in anode potential of valve V9 consequent upon the same negative-going edge of the input square waveform to this value is communicated as a differentiated positive-going pulse to the anode of diode valve V21 and the interconnected suppressor grid of valve V22. Due to the coincidental raising of the cathode potential of diode V21, just referred to, the latter is now ineffective in preventing a positive swing of the suppressor grid of valve V22 by such pulse delivered from the anode of valve V9 and in consequence the valve V22 is triggered in precise synchronism with the particular pulse applied by unit G to unit F to initiate a fresh series of counting cycles by the latter under the overall control of the unit H which determines the (irregular) intervals of the required interrogating pulse transmissions.

The screen grid waveform of valve V22, comprising a series of steep positive-going pulses of some 33 microseconds duration, shown in diagram (*ix*) and hereinafter called the "repetition waveform" is applied to the control-grid of valve V24 which has both cathode and anode load resistances. The cathode output waveform is applied by way of lead 113 to units R and T and also by way of delay unit DEL to the transmitter TX whereby an interrogating pulse is radiated at a time interval set by delay unit DEL after the trailing edge of every pulse of said repetition waveform, as shown in diagram (*x*).

Figure 10A:
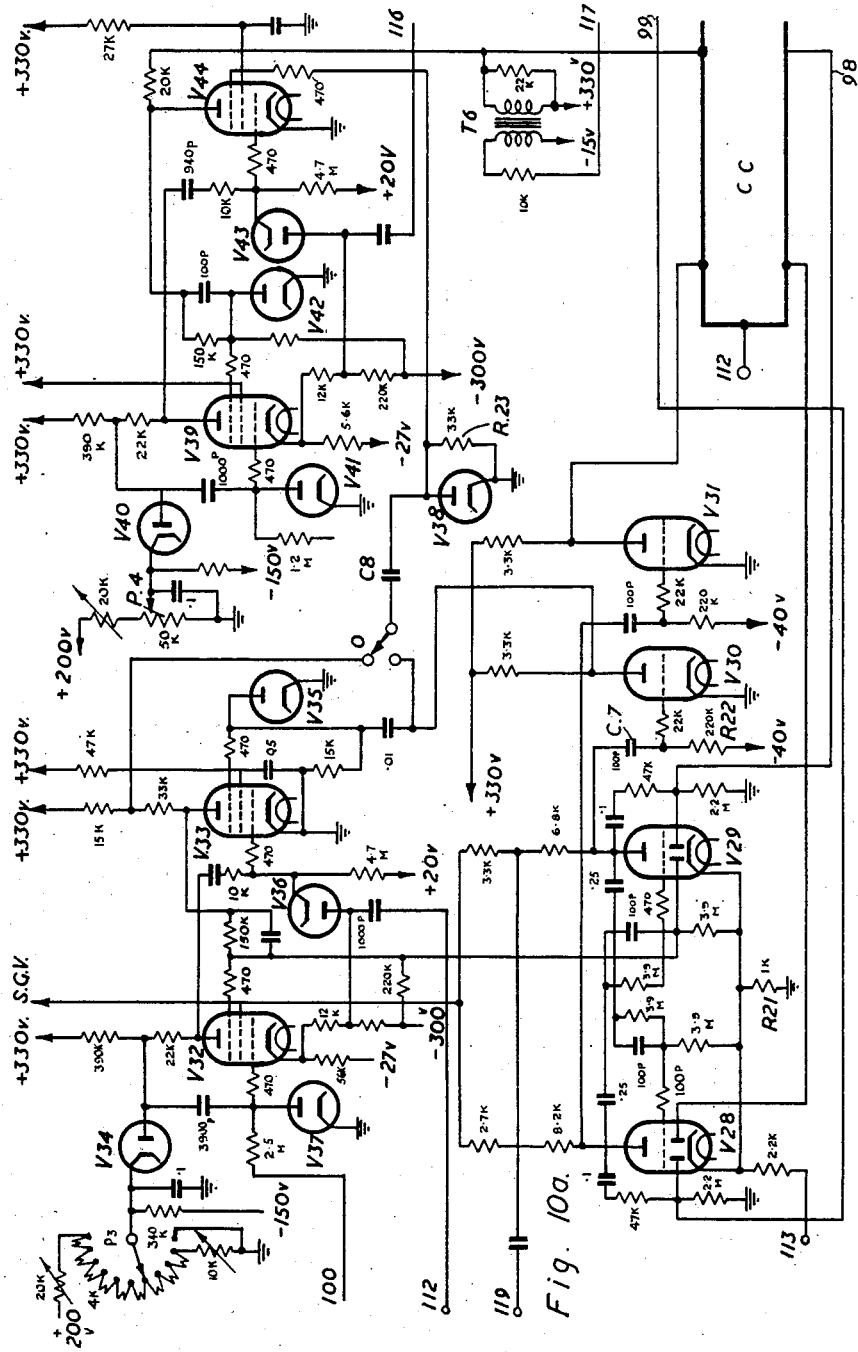

Unit R comprises valves V28, V29, Fig. 10*a*, arranged as a substantially conventional form of multivibrator circuit. The triggering input thereto is the repetition waveform, diagram (*ix*) from unit L applied by way of lead 113 across a common cathode resistance R21. The output waveforms available at the anodes of V29 and V28 respectively are shown in diagrams (*xi*) and (*xii*) and consist of square waves in anti-phase relationship occurring at half the frequency of the "repetition" waveform, the instant of change over being coincident with the leading edges of the input pulses so that each positive-going half cycle of one waveform corresponds to the time period following alternate interrogating pulses and each positive-going half cycle of the other waveform corresponding to the time period following the intermediate series of alternate interrogating pulses.

Figure 11A:
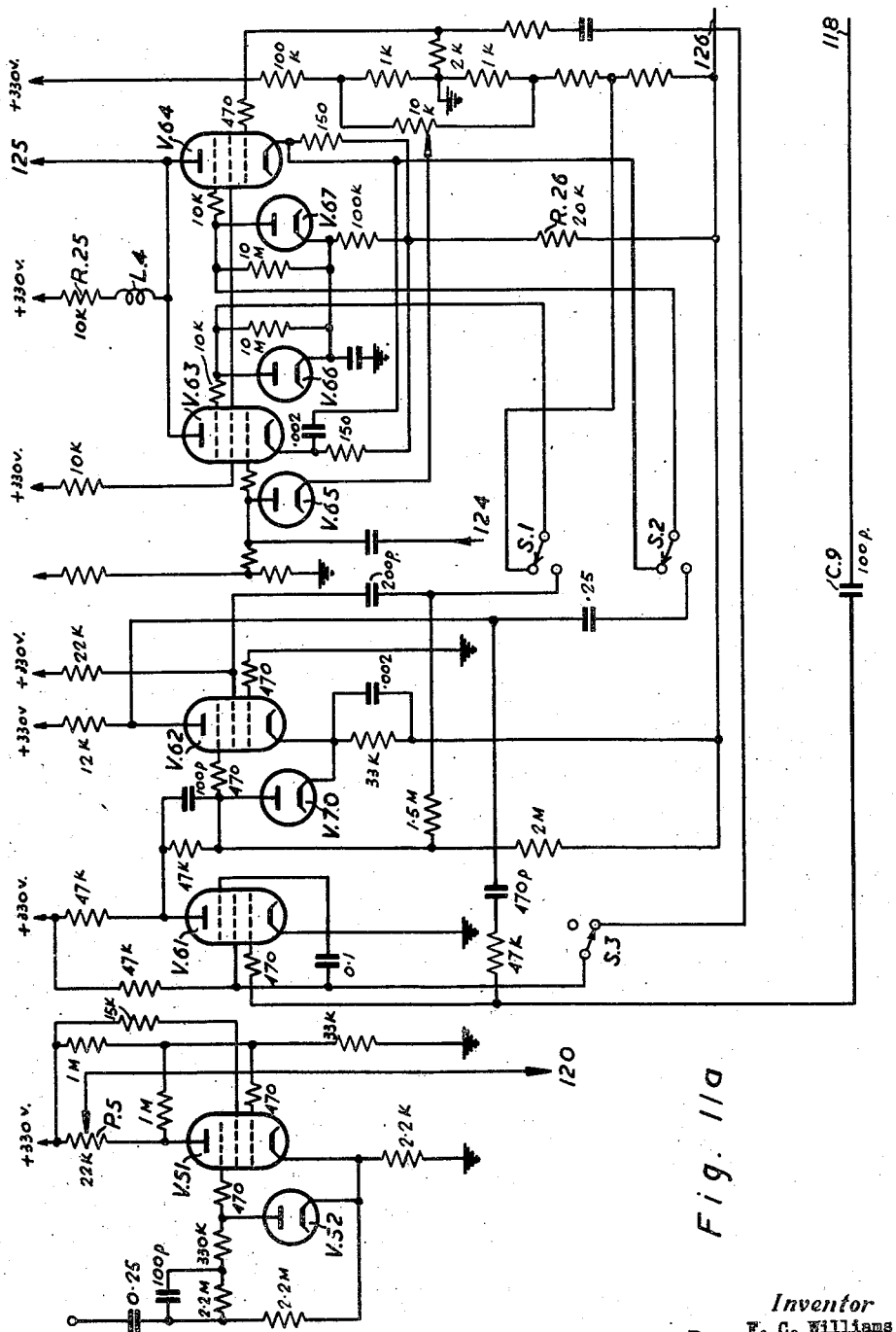

One version of the output waveform from valve V29 is taken by way of lead 119 to valves V51 and V52, Fig. 11a, forming the equivalent of unit R1, Fig. 5 while another version thereof is applied by way of a differentiating network C7, R22 to an amplifier valve V30 corresponding to one half of unit R2 of Figure 5. This valve is normally held cut-off and in consequence a $-ve$ going pulse is provided at its anode coincident with the start of every $+ve$ going cycle of the multivibrator circuit output. This pulse waveform, i. e. at intervals of approximately 20 millisecs. as shown in diagram (xiii) is applied as a triggering control waveform to unit N where it serves to initiate the counting cycle thereof.

Figure 7B:
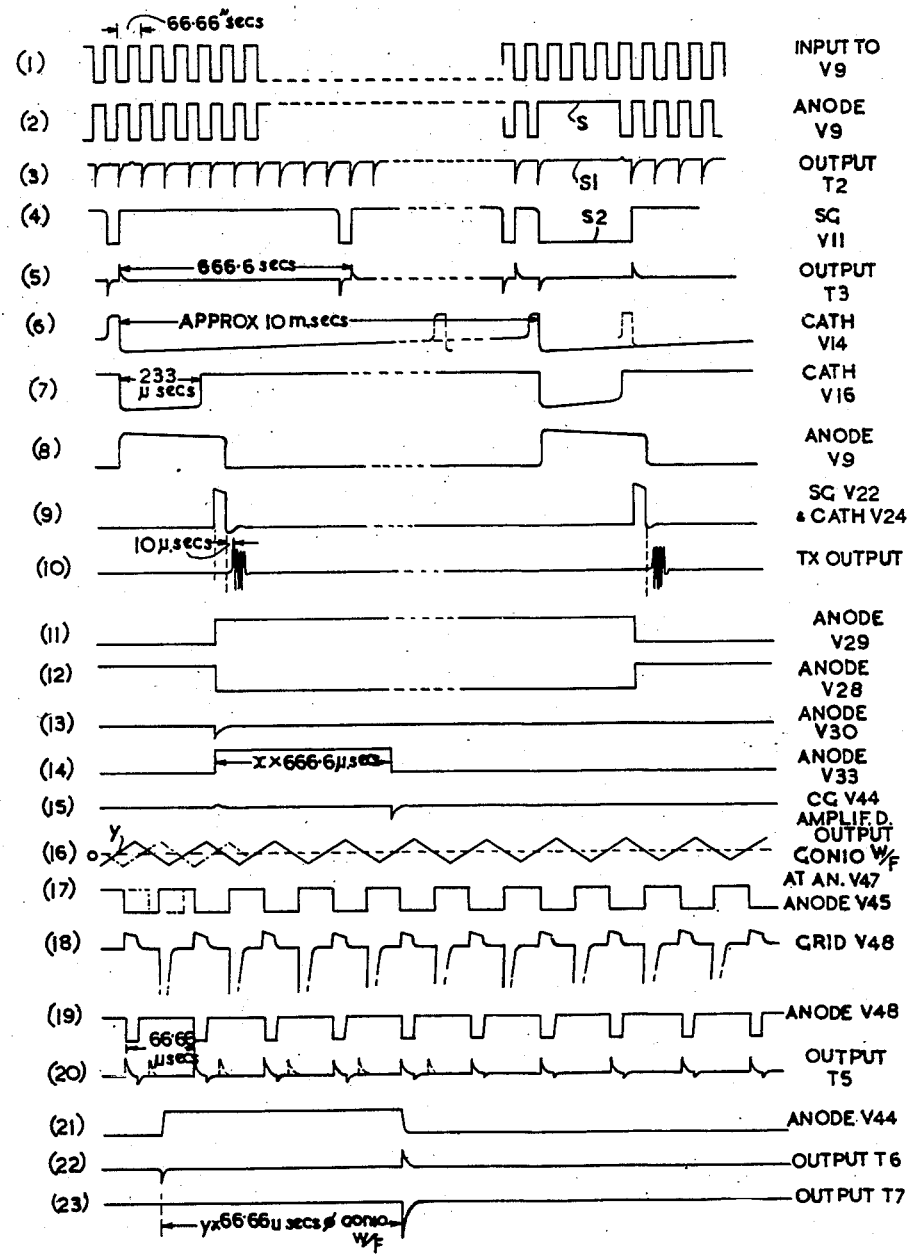

Unit N comprises valves V32 to V37 arranged as a triggered counting circuit of the kind described in co-pending Application Serial No. 766,651, now issued as U. S. Patent No. 2,549,875 filed on even date herewith jointly by Norman Frank Moody and myself, entitled Thermionic Valve Circuits, and is also supplied by way of lead 112 with the pulsed "decade waveform" of diagram (v) already described and operates to count any chosen number of pulses of such "decade waveform" following initial triggering by a pulse from V30 of unit R2 before "flashing-back" to its normal condition. The number of input pulses counted is set by a step by step potentiometer P3 which controls the anode voltage of V34 in the manner more fully described in the aforesaid co-pending application. This potentiometer is calibrated in steps of 100 km. The resultant output waveform at the anode of V33 comprises a substantially square pulse wave of frequency equal to half that of the "repetition waveform" and having a spacing between adjacent $+ve$ and $-ve$ going edges equal to the number of 666.6 $\mu$sec. steps selected by potentiometer P3. Diagram (xiv) Fig. 7b illustrates a typical form of such output waveform.

This waveform is applied by way of switch O and a differentiating circuit C8, R23 to a further triggered counting circuit comprising valves V39 to V44 which corresponds to unit O of Figure 5. This circuit is also of the kind described in co-pending application Serial No. 766,651, now issued as U. S. Patent No. 2,549,875 filed on even date herewith jointly by Norman Frank Moody and myself, entitled Thermionic Valve circuits. The $+ve$ going pulses of the differentiated waveform are eliminated by diode V38 while the $-ve$ going pulses, coincident with the selected "decade waveform" pulse, as shown in diagram (xv) serve to initiate the counting cycle of this further counting circuit. The phase-adjustable waveform output from the goniometer E, Figure 8 (diagram xvi) is applied by way of lead 102 to the control-grid of valve V47, Fig. 10b, which corresponds to unit EA of Figure 5 and operates as an amplifier provided with negative feedback. The output of this valve, comprising an amplified version of the wave of diagram (xvi) but of opposite phase, is applied to the control grid of valve V45, Fig. 10b, which corresponds to unit P of Figure 5. This valve is provided with means, including the diode V46, by which its grid potential excursions are limited to between 0 and $-4$ v., the mean level during application of the amplified goniometer waveform being $-2$ v. The anode output waveform of V45 is, as shown in diagram (xvii) a square wave whose $-ve$ going edges coincide in timing with a datum point $y$ which is the instant when the $+ve$ going front of the goniometer waveform crosses the mean grid potential level. This waveform is applied through transformer T4 which effects a differentiation and reversal of sign, to the control grid of valve V48. The waveform at this valve is shown in diagram (xviii). This valve V48 is normally held cut-off whereby the $+ve$ going pulses of the input waveform produce a square-wave output at its anode as shown in diagram (xix) and which, after differentiation and phase-reversal in transformer T5, comprises a series of $+ve$ going pips each coinciding in timing with the aforesaid datum points $y$ of the goniometer waveform, see diagram (xx).

This waveform is applied by way of lead 116 to the counting circuit V39—V44 already referred to, where it operates as the pulse input which is to be counted. The number of such pulses counted before "flash-back" or return of the circuit to its normal or untriggered condition takes place is determined by the setting of potentiometer P4 which is the one already described, secured in geared connection with the shaft of the goniometer E. The waveform at the anode of V44, shown in diagram (xxi) is differentiated and phase-reversed in transformer T6 to produce a waveform (diagram xxii) which includes a series of $+ve$ going pulses occurring at time instants after each alternate pulse of the repetition waveform (diagram ix) which time instants are set (a) by the calibrated decade selection potentiometer P3 (giving the required 100 km. trace section) (b) by the potentiometer P4 (according to the number of complete revolutions of the goniometer E or required number of 10 km. units) and (c) by the exact angular setting of the goniometer E itself (according to the required fraction of 10 kms.).

Figure 10B:
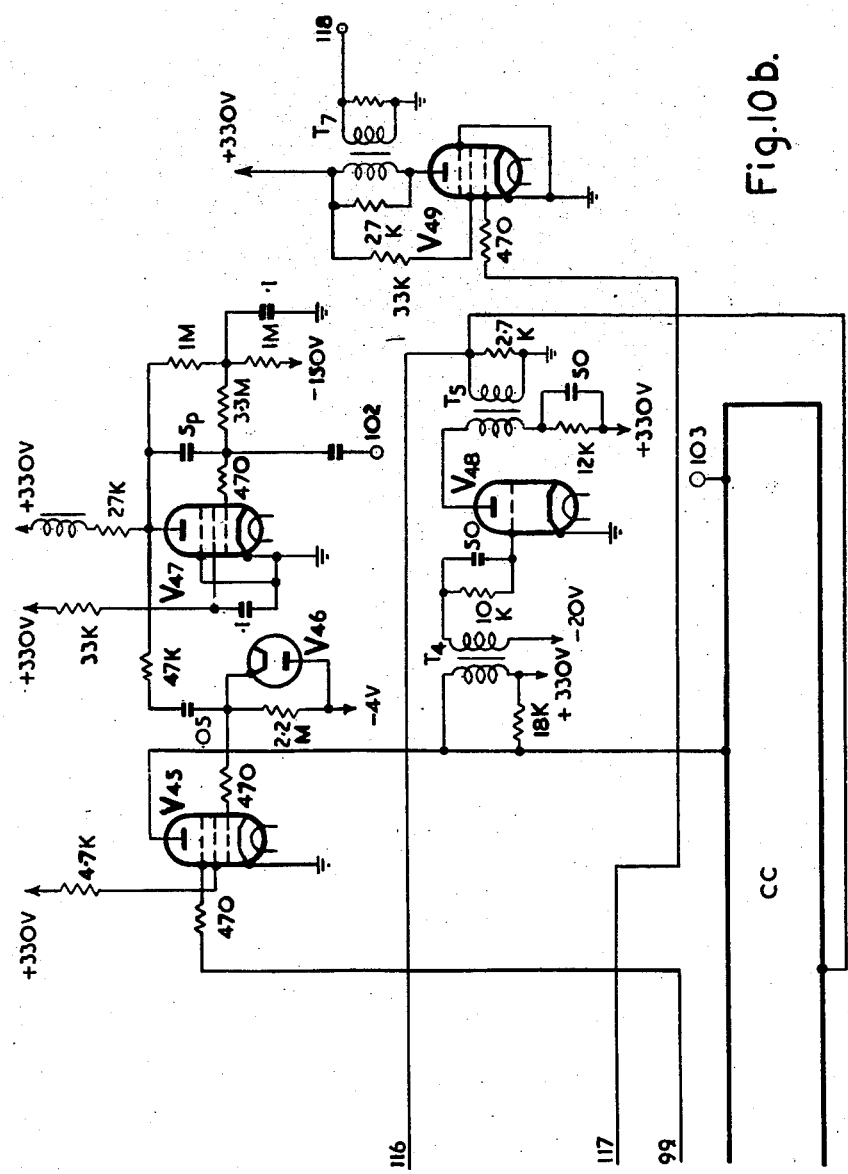

This waveform is applied by way of lead 117 to valve V49, Figure 10b, which corresponds to unit Q of Figure 5. This valve operates at cut-off whereby only an amplified version of the $+ve$ going pulses appears in its anode circuit for application via phase-inverting transformer T7 and lead 118 to units T and U. The output from transformer T8 is shown in diagram (xxiii).

In the above described arrangement of the counting circuit N (valves V32—V37) at least one decade waveform (diagram v) must be applied thereto after each initial triggering to effect its "flash-back" and in consequence the minimum setting attainable by the potentiometer P3 corresponds to a delay of 666.6 $\mu$secs. and since the delay setting controls associated with the circuits of valves V39 to V44 and V45—V47 are only operative to add to the delay imposed by unit N, only delay periods which are in excess of a "range" equivalent of 100 kms. are available. To avoid this limitation means, in the form of relay-operated contacts O are provided, by which the decade counting circuit of valves V33 to V37 can be cut out and the initial triggering of the circuit of unit O (valves V39 to V44) effected directly by the pulse from V30. These relay contacts are operated by a suitable energizing circuit which is closed only when the potentiometer P3 rests on its first or zero contact.

It will be appreciated that the above cycle of events only takes place when valve V30 is operated, i. e. during alternate pulse-repetition periods. During the intervening periods valve V31 is operated instead and this valve controls a substantially identical set of circuits, designated by the rectangle CC, operating in identical manner but at intervals set by the various controls associated with the second of the parallel circuits i. e. units N1, O1, P1 and EA1 of Figure 5. A common output is provided through transformer T6 and valve V49. The valve circuit V48 is also common to both arrangements. During operation of one of these two parallel circuits, an appropriate suppression potential is supplied from the anode of the conducting valve of the unit R by way of leads 99 or 98 to the suppressor grid of valve V45 or its equivalent in the other circuit CC.

Unit R1 comprises the valves V51, V52, Fig. 11, arranged as an amplifier circuit. The input waveform applied to the suppressor grid of valve V52 is that of diagram (xi) Fig. 7b, i. e. a square pulse waveform of half repetition pulse frequency. This waveform is redrawn in diagram (4) Fig. 7c. An adjustable amplitude version of a similar waveform as shown in diagram (5) is taken from potentiometer P5 and applied by way of lead 120 to one of the horizontal deflecting plates Y1 of the cathode ray tube CRT, where it serves to deflect the tube beam to left and right alternately for periods which coincide with those following alternate interrogation pulses. For convenience of comparison the timing of two interrogating pulses J and their related response signals j1 and j2 is shown in diagram (1) of Fig. 7c. The repetition pulse waveform of diagram (ix) Fig. 7b is redrawn in diagram (2) Fig. 7c, while the delay-set pulses provided by unit Q and shown in diagram (xxiii) are redrawn in diagram (3), Fig. 7c.

Figure 11B:
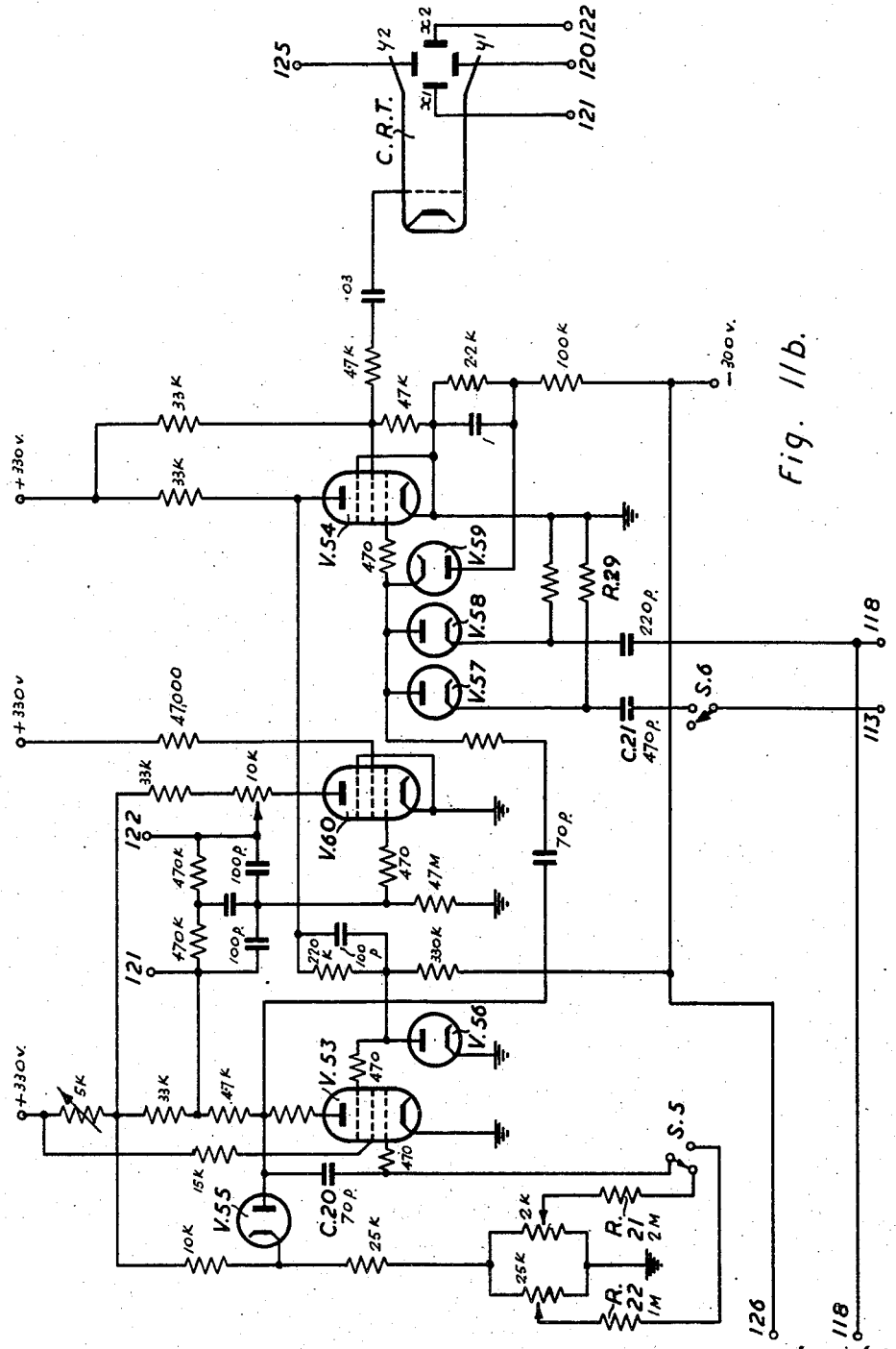

Unit T comprises valves V53—V60, Fig. 11b. Valves V53—V59 are arranged in a trigger circuit of the kind described in copending application Serial No. 766,651, now issued as U. S. Patent No. 2,549,875, filed on even date herewith jointly by Norman Frank Moody and myself, entitled Thermionic Valve Circuits, and constitute a time-base generating circuit of which valve V53 is the time-base valve developing a saw-tooth waveform at its anode, there being one saw-tooth wave every time the circuit is triggered. The speed of the time-base thus provided is determined by the condenser C20 and one or other of the leak resistances R21, R22, the latter being chosen by operation of switch S5 which is one of several ganged together and corresponding in function to the switch S, S1 of Fig. 5. All these switches S1—S6 are shown in the normal time-base position for affording a display as shown in Fig. 6 (e). The opposite position provides the auxiliary high-speed time-base display as shown in Fig. 6 (g).

The circuit of valves V53—V59 is triggered to generate each saw-tooth voltage pulse by the application of a negative-going pulse to the control grid of valve V54. One source of such input triggering signals is the output waveform from unit Q shown in diagram (3) Fig. 7c and consisting, as already described of a series of negative-going pulses, alternate ones of which are delayed by the circuit of units N, O and P and the intermediate ones of which are delayed by the circuit of units N1, O1 and P1. This triggering input is applied by way of lead 118 to valve V54 through diode V58. Diagram (6) illustrates the output waveform from the anode of valve V53 under such normal time-base conditions.

Figure 7C:
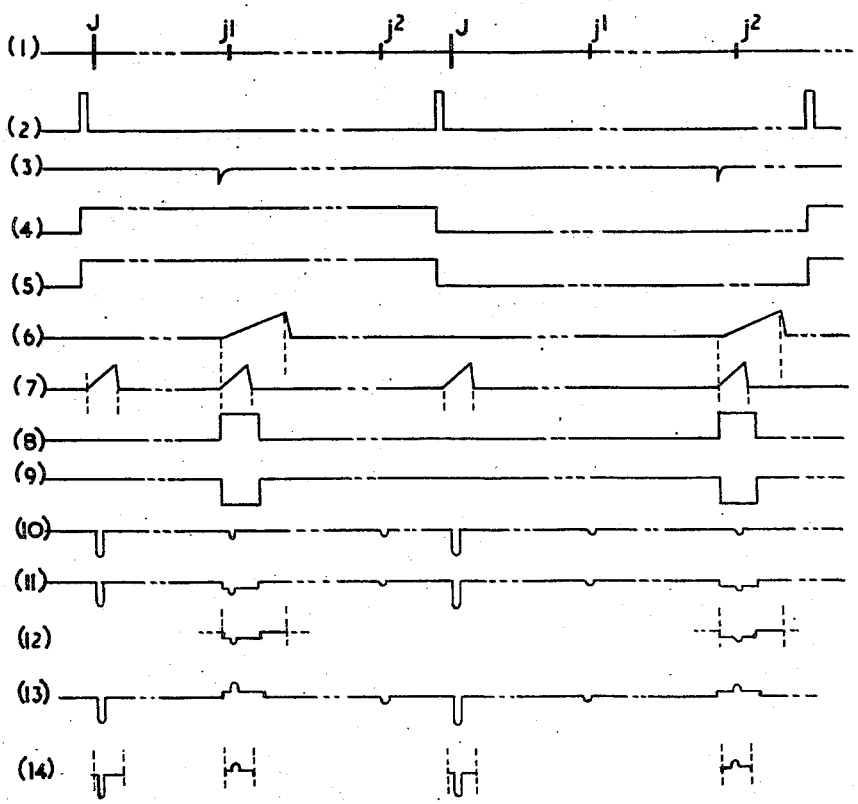

In the high-speed auxiliary time-base condition when the switches S are reversed the repetition waveform of diagram (2) Fig. 7c is also applied to valve V54 by way of lead 113, switch S6 and condenser C21. The latter, in conjunction with resistance R29 serves to differentiate the input positive-going pulse whereby the circuit of valves V53—V59 is triggered by the trailing negative-going edge of each repetition pulse. Since such circuit is also triggered as before by the waveform of diagram (3) the resultant output at the anode of valve V53 is as shown in diagram (7).

Valve V60 operates as a paraphase amplifier of the output of valve V53 to provide a balanced push-pull deflecting voltage output which is fed to the x1 and x2 deflector plates of the tube CRT by way of leads 121, 122.

Unit U comprises valves V61, V62 and V70 Fig. 11a arranged as a relaxation oscillator circuit of the so-called "flip-flop" type. This circuit provides a pulse output every time it is triggered. The triggering input comprises the delay-set negative-going pulses from unit Q shown in diagram (3); this input waveform is applied by way of lead 118, and condenser C9 to the control-grid of valve V61. The resultant output waveform at the screen-grid of valve V61 is shown in diagram (8) and comprises a series of short square positive-going pulses whose leading edges are in synchronism with the delay-set pulses of diagram (3). This screen-grid output is applied by way of switch S3, when in the normal display position, to the control-grid of valve V64 of unit V.

The waveform available at the screen-grid of valve V62 is similar to that of diagram (8) and this is applied by way of switch S1, when in the auxiliary high-speed display position, to the suppressor grid of valve V63 of unit V while an antiphase version of such waveform, shown in diagram (9) and drawn from the anode of valve V62 is similarly applied by way of switch S2, when in the auxiliary high-speed display position, to the suppressor grid of valve V64 of unit V.

Unit V comprises valves V63—V67 arranged to form a polarity switching circuit for the received signal output from the receiver Rx of Fig. 5, before application to the cathode-ray tube to effect deflection of the time-base traces thereof and also to form mixing circuit for combining the pulses provided by unit U with such received signals to produce the stepped normal display of Figure 6 (e) and the back-to-back high-speed auxiliary display of Figure 6 (g). This circuit employs an arrangement of the kind known as a "long-tailed pair" characterised by a common cathode impedance R26 and a common anode output load impedance R25 and L4.

In the normal display condition shown, the suppressor grid of valve V64 is connected to its associated cathode by way of switch S2 whereby the valve anode is operative while the suppressor grid of valve V63 is connected by way of switch S1 to a potential which is sufficiently negative to cut-off anode current flow in that valve.

The rectified signal input from the receiver Rx in the form of negative-going pulses, shown in diagram (10) is applied by way of lead 124 to the control-grid of valve V63. Each negative signal voltage decreases the screen-current flow in this valve with consequent decrease of potential drop across the common cathode resistor R26. This is equivalent to a positive-going input to the control-grid of the opposite valve V64 whose anode and screen-grid currents increase and thereby produce a negative-going output signal pulse across the anode load impedance of L4, R25. This output signal is applied by way of lead 125 to the deflector plate Y2 of the tube CRT.

The positive pulses of waveform (8) which are applied to the control-grid of valve V64 from valve V61 of unit U also cause a negative-going signal across the anode load L4, R25 whereby the signal output applied to the deflector plate Y2 under the normal time-base display condition is as shown in diagram (11). Since only those portions of this signal output which occur during the times of the saw-tooth pulses of diagram (6) will be displayed, the resultant tube display will consist only of the portions shown in full lines in diagram (12) and as one of these occurs while the tube beam is displaced to the left and the other while such beam is displaced to the right by the waveform of diagram (5) the display of Figure 7(e) is provided.

In the auxiliary high-speed display conditions with switches S1—S6 reversed, the suppressor grid of valve V63 is connected by way of switch S1 to a source of negative potential of such value that the anode is cut-off at all times except during the periods of the positive pulses of diagram (8) applied thereto from the screen-grid of valve V62 of unit U. Similarly, the suppressor grid of valve V64 which is connected to the associated cathode by way of diode V67 and is normally permitting anode current flow in the valve, is driven negatively to cut-off the anode of valve V64 during the corresponding negative pulses of diagram (9) which are applied thereto by way of switch S2 from the anode of valve V62 of unit U.

The received signal input, applied as before by way of lead 124 will be operative as follows. In the absence of a pulse from valve V62 of unit U the operation will be as before and will result in negative-going signals across the anode load impedance of valves V63, V64. During the periods of pulse output from valve V62, however, the suppressor grid of valve V63 will be opened and the suppressor grid of valve V64 will be cut-off. The negative-going signal input to the control-grid of valve V63 will now produce positive-going signals at the anode and the resultant signal output applied to the deflector plate Y2 will now be as shown in diagram (13). The portions displayed will be those coincident in timing with the saw-tooth pulses of diagram (7), i. e. those shown in full lines in diagram (14) so as to provide the display shown in Figure 6(g).

Conveniently the various controls associated with the setting-up of each of the two adjustable delay circuits of units N, O, P and N1, O1 and P1 may be effected respectively by a single control member or alternatively may have the delay value set up indicated by a single display operated through cyclometer mechanism.

Referring now to Figure 12, this shows one arrangement for preventing the operation of the transmitter section of a "beacon" station such as that shown at A or B of Fig. 1, except in response to an interrogation signal of predetermined characteristic form. In this figure 50 denotes a delay network of known artificial line form comprising sections 51 and 52 and terminated by a suitable load resistance 53.

An input pulse signal from the associated receiver applied to input terminal 54 will be transmitted immediately to the suppressor grid of valve 55 and, after a time-delay dependent upon the characteristic of section 51, to the control grid of valve 56. After a further delay dependent upon the characteristics of section 52 the said input signal will be transmitted to the control grid of valve 55.

Both control and suppressor grids of valve 55 are arranged normally to be held beyond cut-off by the application of suitable bias voltages thereto while the screen-grid voltage of valve 55 is derived from a network which includes resistance 57 in the anode circuit of valve 56.

Valve 56 is arranged normally to be cut-off at its control grid by the application of suitable bias voltage and when in this condition the voltage at its anode is arranged to be at a suitable potential for application to the screen grid of valve 55 for operation. If however valve 56 is opened-up by application of a positive signal to its control-grid then the resultant anode voltage fall will cut-off valve 55 at its screen grid.

With such an arrangement it is necessary to apply an input signal to the terminal 54 comprising two positive pulses whose leading edges are separated by a time interval substantially equal to the sum of the delay times of sections 51 and 52 of the network 50. Under these conditions the first pulse will reach the control grid of valve 55 in synchronism with the second pulse reaching the suppressor grid of the same valve. As no signal will be applied at this instant to the control-grid of valve 56, the screen-grid of valve 55 will be at an appropriate potential for current flow and an output signal will be made available across the anode load resistance 58 for controlling the associated transmitter. Signals not having the appropriate timing will clearly fail to open-up either control or suppressor grid of the valve 55 or will cut-off the screen-grid of that valve due to opening up of valve 56.

I claim:

1. In an interrogating system, a master oscillator, a frequency divider fed by the output of said oscillator, means connected to said frequency divider for intermittently varying the fraction at which the frequency divider divides the frequency, a radio transmitter, means for modulating said transmitter with the output of said frequency divider; a receiver for receiving energy from said transmitter that has been re-radiated, a cathode ray tube having horizontal ray deflecting means and vertical ray deflecting means, a time base generator controlled by the output of said frequency divider for controlling said horizontal ray deflecting means, and means connecting the output of said receiver to said vertical ray deflecting means.

2. In an interrogating system, a master oscillator, a first frequency divider fed by the output of said oscillator, a second frequency divider fed by the output of the first one, means connected to said second frequency divider for intermittently varying the fraction at which the second frequency divider divides the frequency, a radio transmitter, means for modulating said transmitter with the output of said second frequency divider, a receiver for receiving energy from said transmitter that has been re-radiated, a cathode ray tube having horizontal ray deflecting means and vertical ray deflecting means, a time base generator controlled by the output of said second frequency divider for controlling said horizontal ray deflecting means, means connecting the output of the first frequency divider to the said vertical ray deflecting means to thereby generate a series of marker pips; and means connecting the output of said receiver to said vertical ray deflecting means.

3. A radio navigation system for use in a mobile craft comprising an interrogating transmitter-receiver in said craft including means for transmitting a series of interrogating pulses and means for irregularly varying the repetition frequency of said pulses; a responder beacon located on the ground including means for receiving the interrogating pulses of irregular repetition frequency and means for transmitting responder pulses in response to said interrogating pulses; and in said transmitter-receiver means for receiving said responder pulses and indicator means for comparing the phase relationship between the transmitted interrogating pulses and the received responder pulses; the means for transmitting a series of interrogating pulses comprising an output stage having a modulator therefor, a master oscillator, and a frequency divider connected between the output of the master oscillator and the input of said modulator; said means for varying the repetition rate of said pulses comprising means connected to said frequency divider for controlling the fraction at which it divides the frequency.

FREDERIC CALLAND WILLIAMS.

REFERENCES CITED

The following references are of record in the file of this patent:

UNITED STATES PATENTS

| Number | Name | Date |
|---|---|---|
| 2,405,238 | Seeley | Aug. 6, 1946 |
| 2,405,239 | Seeley | Aug. 6, 1946 |
| 2,415,359 | Loughlin | Feb. 4, 1947 |
| 2,420,516 | Bischoff | May 13, 1947 |
| 2,421,017 | Deloraine | May 27, 1947 |
| 2,423,082 | Busignies | July 1, 1947 |
| 2,426,216 | Hight | Aug. 26, 1947 |
| 2,427,220 | Luck | Sept. 9, 1947 |
| 2,452,598 | Page | Nov. 2, 1948 |